United States Patent [19]

Cloutier

[11] 4,361,387

[45] Nov. 30, 1982

[54] CAMERA MECHANISM

[75] Inventor: Robert P. Cloutier, Spencerport, N.Y.

[73] Assignee: Eastman Kodak Company, Rochester, N.Y.

[21] Appl. No.: 235,491

[22] Filed: Feb. 18, 1981

[51] Int. Cl.³ .......................... G03B 7/10; G03B 17/38
[52] U.S. Cl. ........................................ 354/43; 354/50; 354/173; 354/266
[58] Field of Search .................. 354/26, 29, 30, 36, 354/38, 43, 44, 48, 50, 51, 171, 173, 204–206, 266–268; 352/121, 137, 141, 169

[56] References Cited

U.S. PATENT DOCUMENTS

| | | | |
|---|---|---|---|
| 3,098,418 | 7/1963 | Reiher | 354/173 |
| 4,106,041 | 8/1978 | Lange | 354/206 |
| 4,201,460 | 5/1980 | Stemme et al. | 354/173 X |
| 4,204,759 | 5/1980 | Yamada et al. | 354/173 X |
| 4,294,527 | 10/1981 | Hashimoto et al. | 354/173 X |

Primary Examiner—L. T. Hix
Assistant Examiner—William B. Perkey
Attorney, Agent, or Firm—R. L. Randall

[57] ABSTRACT

In a photographic camera, a single electric motor serves as the only electro-mechanical transducer in an exposure adjusting device and also performs at least two other non-contemporaneous functions, such as a film advancing and/or shutter cocking function, and a shutter releasing function.

13 Claims, 20 Drawing Figures

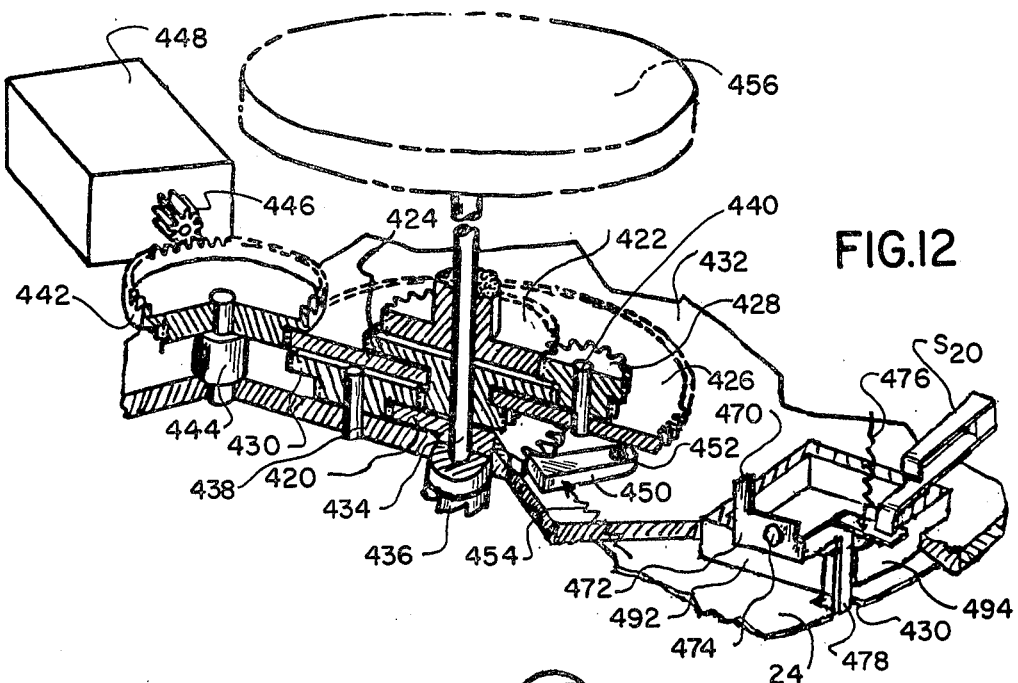
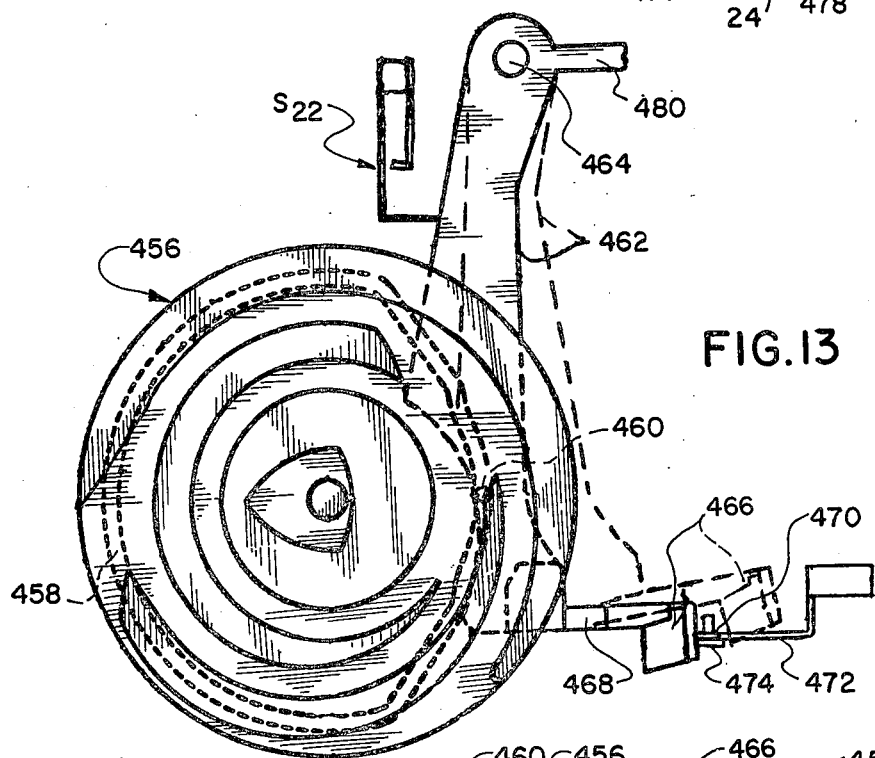
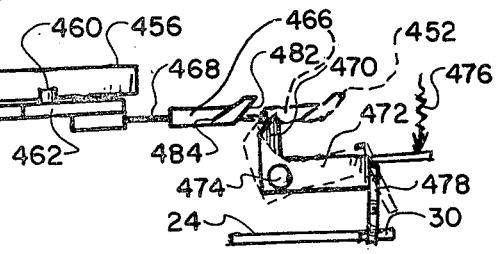

CAMERA MECHANISM

BACKGROUND OF THE INVENTION

1. Field of the Invention

The present invention relates to motor driven cameras in which a single motor serves as the only electro-mechanical transducer in an exposure adjusting device and also performs another non-contemporaneous camera function, such as a film advancing and shutter cocking function or a shutter releasing function.

2. Description of the Prior Art

Conventional automatic exposure control devices used in cameras include at least one electro-mechanical transducer for regulating the shutter and/or diaphragm element in response to an electrical signal related to scene luminance. For example such a transducer may comprise a so-called stepper motor, a galvanometer, a solenoid, or an electro-magnet.

In addition to one or more transducers employed in an exposure control system, many cameras include additional electro-mechanical transducers, such as electric motors, to perform sequentially other non-contemporaneous camera functions e.g. to simultaneously advance the film and cock the shutter, to focus the objective lens, and to release the cocked shutter.

In some cases in which the same electric motor is used to advance the film and cock the shutter, it also performs another subsequent function that often is performed manually in analogous types of cameras. For example, U.S. Pat. No. 3,098,418 issued to W. Reiher on July 23, 1963 shows a camera in which an electric motor drives the film advancing and shutter cocking mechanism. Upon completion of that operation, the motor is disengaged automatically from the mechanism and is coupled to a lens focusing mechanism, which is then adjustable by means of a manually operated switch that both energizes and controls the direction of rotation of the motor. In another construction, the motor used simultaneously to wind film and cock the shutter has also been employed subsequently in cooperation with other transducers used for different purposes. For example, U.S. Pat. No. 2,983,207, issued to K. Gebele on May 9, 1961 shows such a camera, in which a single motor advances the film and simultaneously cocks the shutter, adjusts the shutter speed or aperture or both by moving corresponding members to positions determined by the needle of a galvanometer, and then initiates the release of the camera shutter by de-energizing an electromagnet.

It has also been proposed previously to use the same motor employed for film advancing and shutter cocking in a different transducer mode of operation to perform a second function. For example, in the camera shown in U.S. Pat. No. 3,613,542 issued to W. Wiessner on July 8, 1968, when the operator presses the shutter release button, a switch is closed to energize a motor that first runs in a predetermined direction to trip the shutter and then automatically reverses its direction of rotation to simultaneously advance the film and re-cock the shutter. In U.S. Pat. No. 3,928,859, issued to D. M. Peterson on Mar. 22, 1974, a motor is coupled to the film winding and shutter cocking mechanism through a one-way clutch and to the focusing mechanism through a slip clutch. When a button is depressed to initiate an exposure, the motor runs in a predetermined direction, with the one-way clutch preventing operation of the film advancing and shutter cocking mechanism while the slip clutch drives the lens from its far-focus position toward its near-focus position. An automatic focusing system de-energizes the motor when the lens has reached its proper position, whereupon a solenoid releases the cocked shutter. Upon completion of exposure, the motor runs in the opposite direction and the one-way clutch drives the mechanism that cocks the shutter and advances the film in preparation for the next exposure. While these two functions are being performed, the slip clutch returns the lens to its far position and then slips to allow the shutter cocking and film advancement operation to proceed to completion.

For purposes of convenience and clarity, some of the foregoing references have been described as if each operating cycle begins with the release of the shutter release, but it should be understood that in all cases a film advancing and/or shutter cocking function preceeds subsequent functions performed by the motor to expose the film area thus brought into exposure position. Accordingly, the important consideration is not the manner in which a sequence of functions is described, but, rather, the fact that each of the foregoing references discloses the use of a single motor to perform two mutually non-contemporaneous functions, thereby providing an opportunity to eliminate one or more separate electro-mechanical transducers. However, none of these references shows or suggests a construction in which a single motor performs a focusing or exposure control function and at least two other non-contemporaneous functions, such as a film winding and/or shutter cocking function, and a shutter releasing function. Furthermore, the reference constructions inherently obviate such applications. For example, the termination of rotation of the motor establishes the exposure control adjustment and the lens focus adjustment in the respective Gebella and Petersen references, but, because the motor remains coupled to the adjusted element, the motor cannot subsequently be employed to trip the shutter without destroying the adjustment that it previously affected. Similarly, if a mechanism of the type disclosed by the Weissner references is used to trip the shutter by reversing the motor after completion of the shutter cocking and/or film advancing function, reversed motor rotation cannot also perform a lens focusing or exposure control adjustment at the necessary time, i.e. immediately prior to release of the shutter. Furthermore, all of the reference constructions inherently preclude using the same motor that advances the film and/or cocks the shutter to perform a focusing or exposure adjusting function involving selective bi-directional motor rotation.

SUMMARY OF THE INVENTION

In accordance with a preferred embodiment of the present invention, a single motor in a camera operates a relatively simple and reliable mechanism that sequentially assumes different modes of operation for selectively coupling the motor to different camera elements to perform at least three non-contemporaneous functions including a film advancing and/or shutter cocking function, an exposure control function, and a third function such as releasing the camera shutter. While performing the exposure control adjustment function, the motor serves as an electro-mechanical transducer to adjust the shutter and/or diaphragm as a function of scene luminance. The mechanism prevents the exposure control adjustment from interfering with other functions performed by the motor and vice versa without recourse to clutches or other frictionally operated devices. The invention is particularly suitable for use in disk film cameras and is disclosed in that context, but it is also applicable to conventional roll film cameras. Additionally, various novel means contemplated by the invention for simplifying adjustment of the shutter speed or exposure aperture by an electric motor can be employed advantageously in cameras in which a single motor does not necessarily perform more than two non-contemporaneous functions.

Various means for practicing the invention and other features and advantages thereof will be apparent from the following detailed description of illustrative preferred embodiments of the invention, reference being made to the accompanying drawings.

IN THE DRAWINGS

Figure 6:
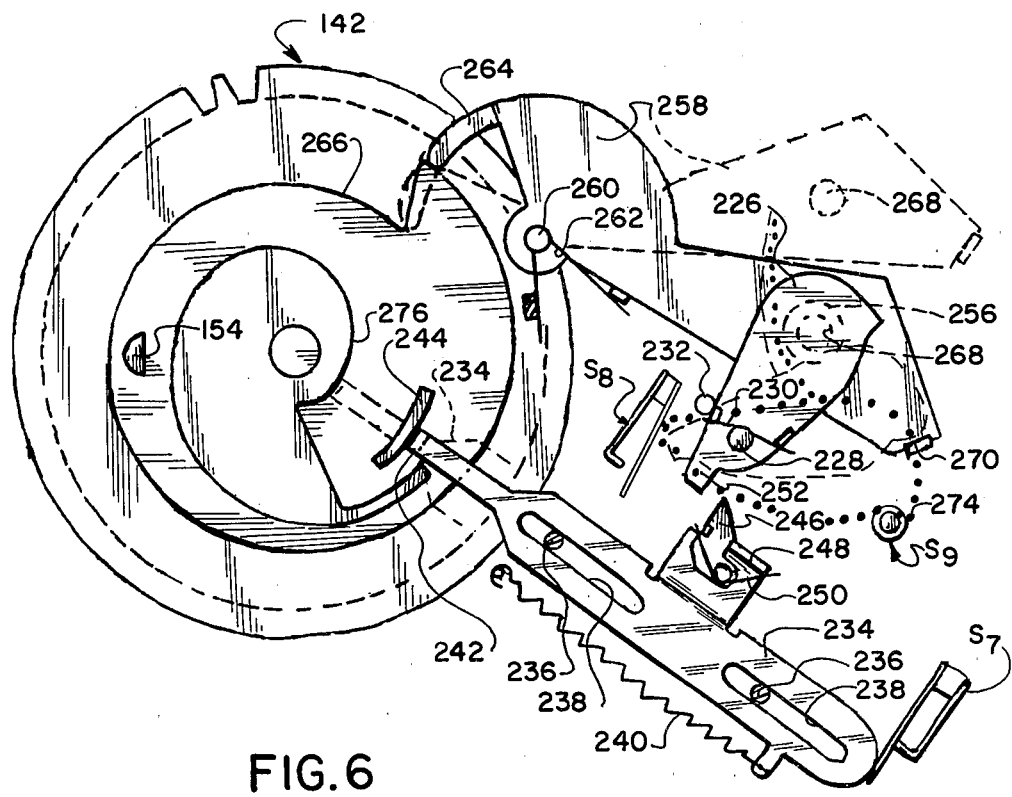
FIG. 6 is a front elevational view of the shutter and aperture assembly of the mechanism shown in FIG. 5.
Figure 8:
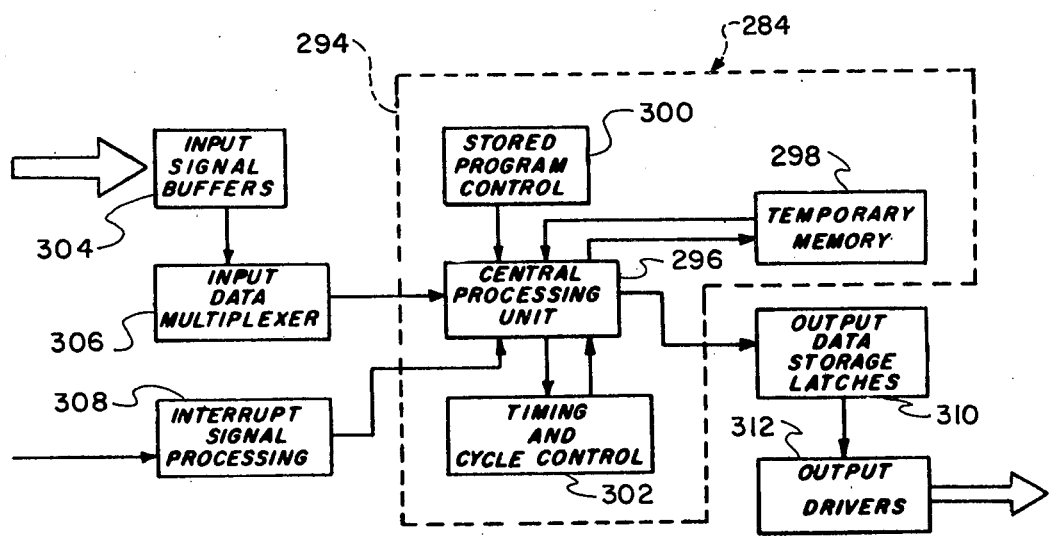
FIG. 8 is a block diagram of the logic and control unit (LCU) incorporated in the electrical circuitry shown in FIG. 7.
Figure 9A:
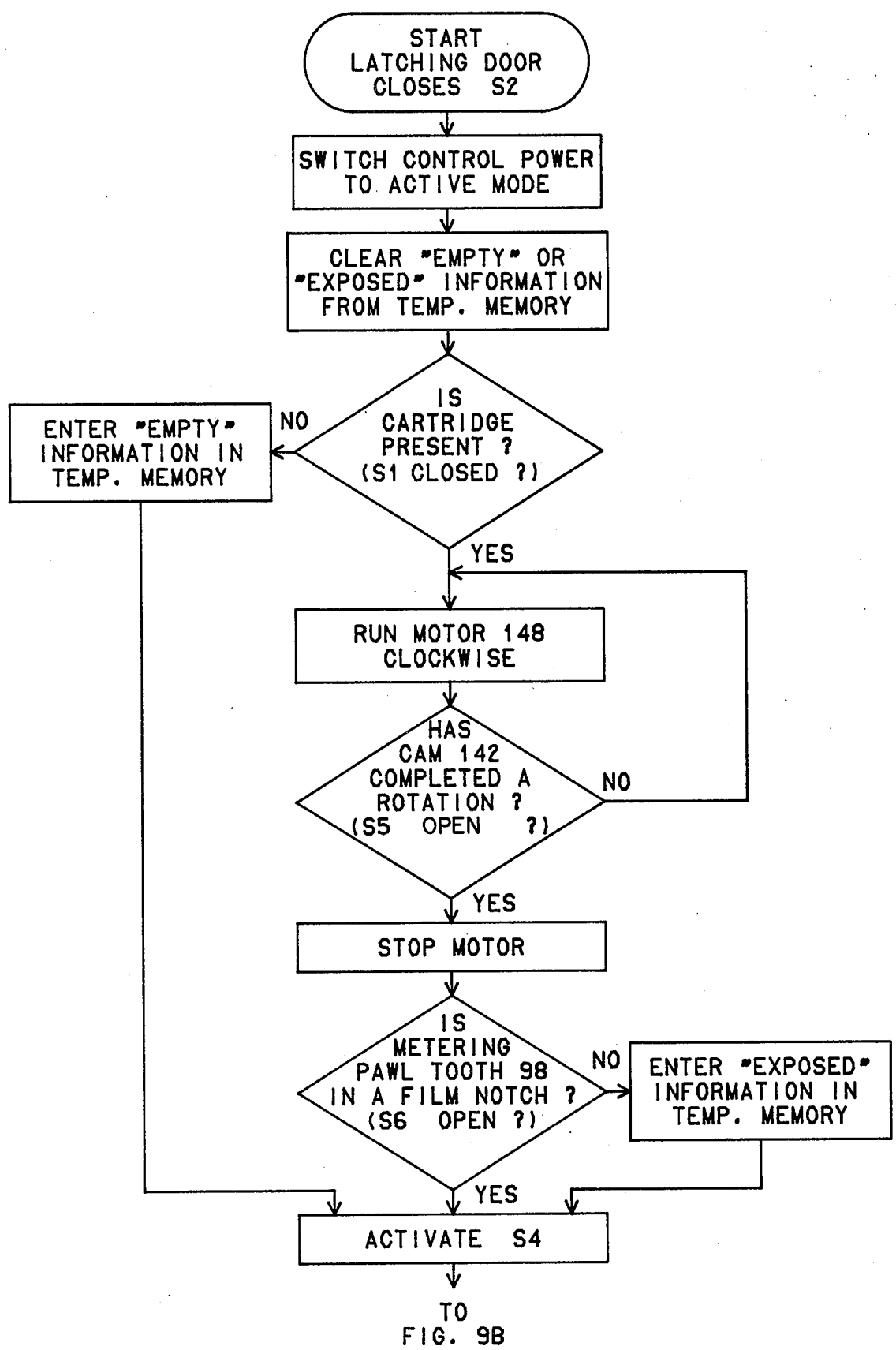
Figure 9B:
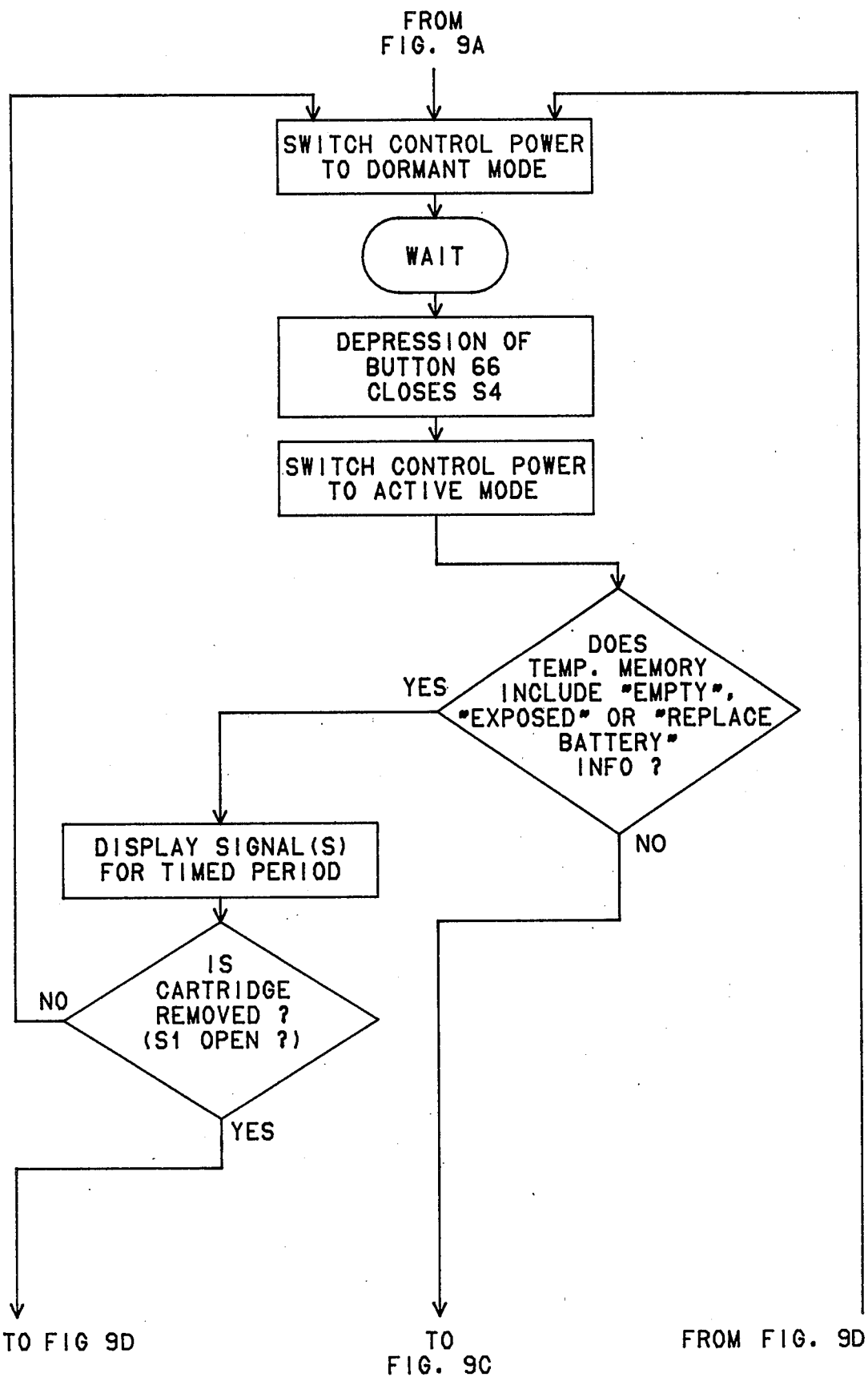
Figure 9C:
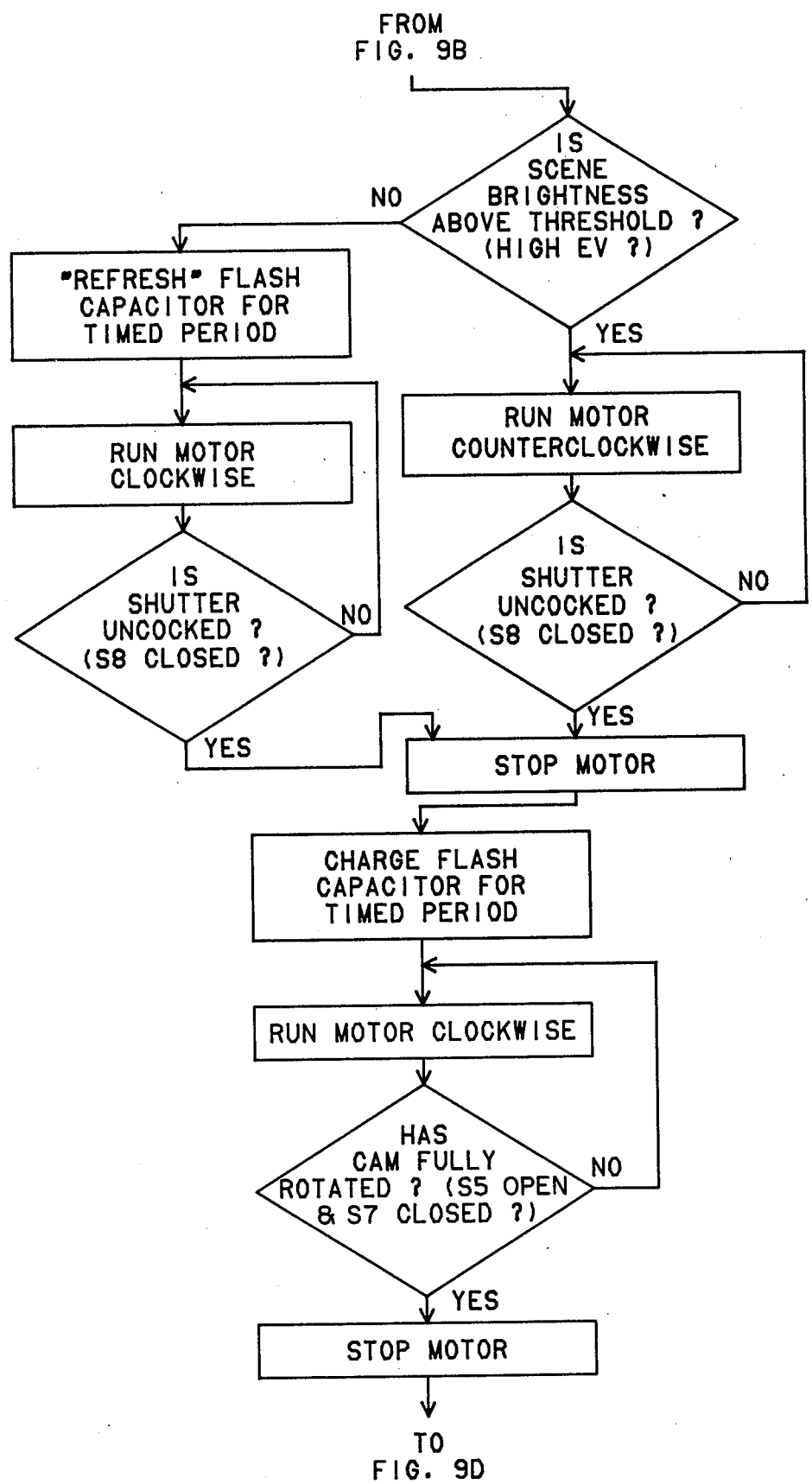
Figure 9D:
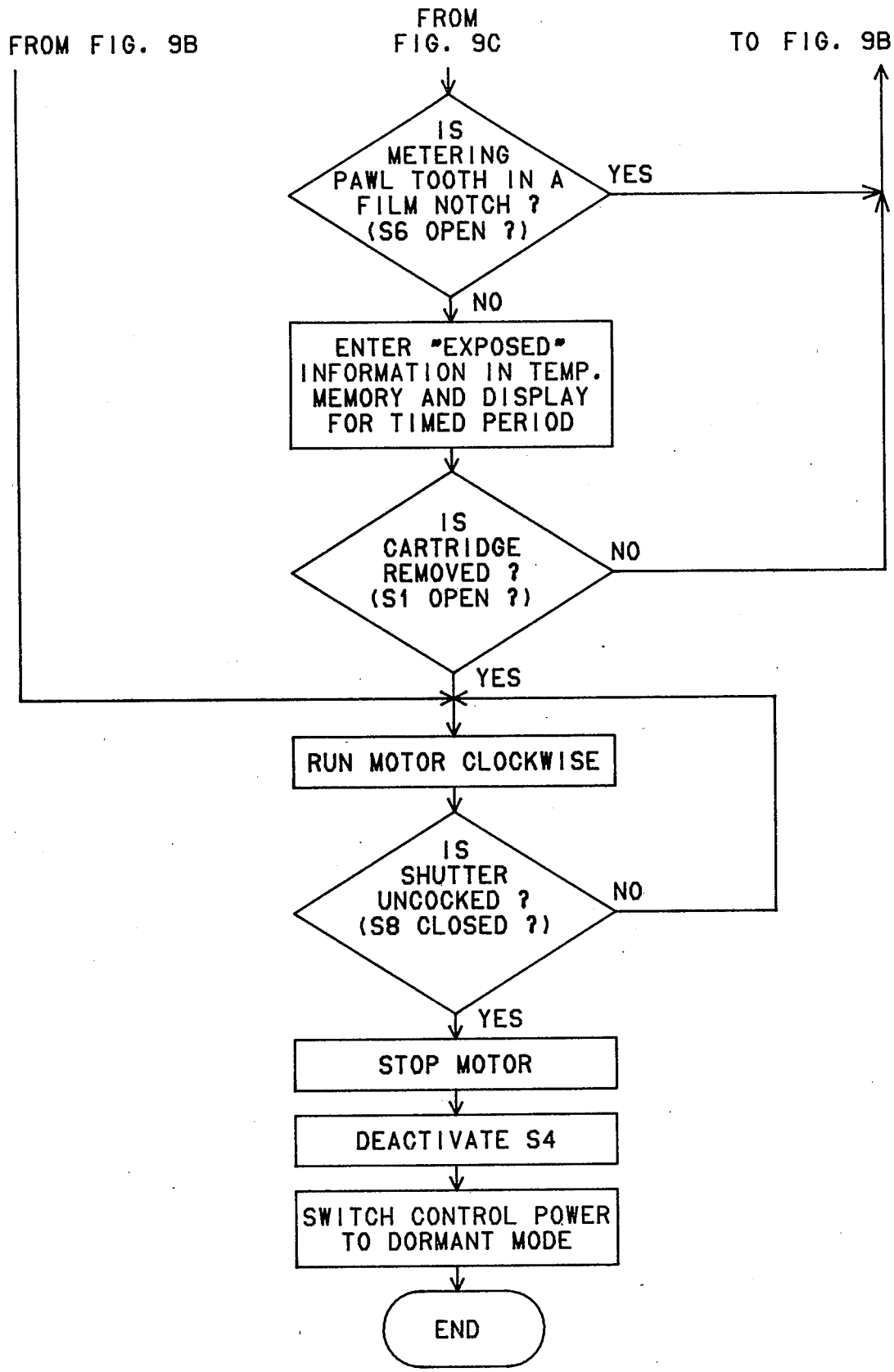
Figure 10:
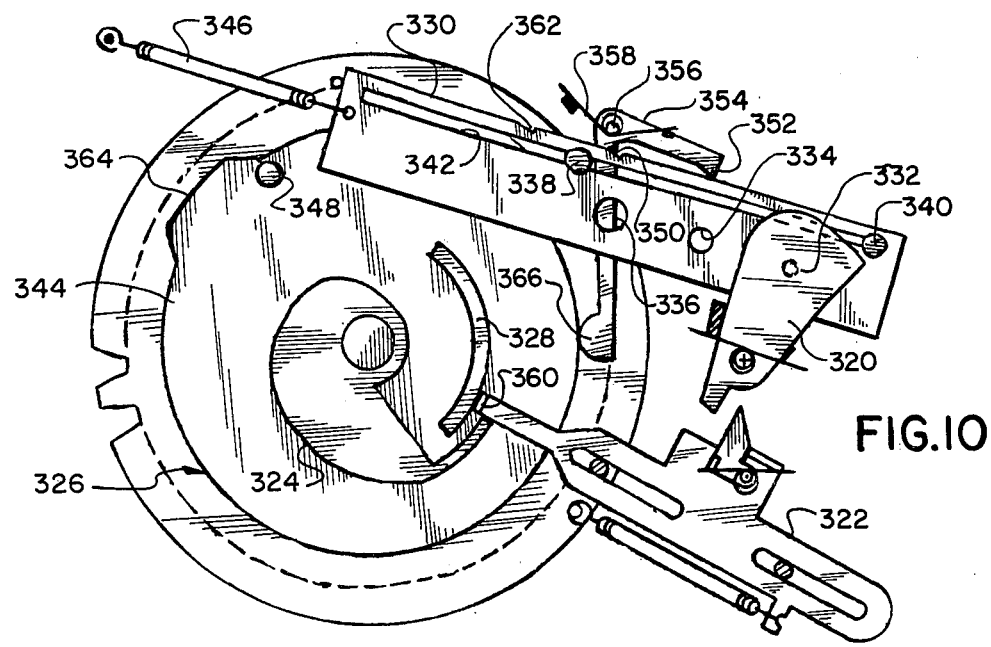
Figure 11:
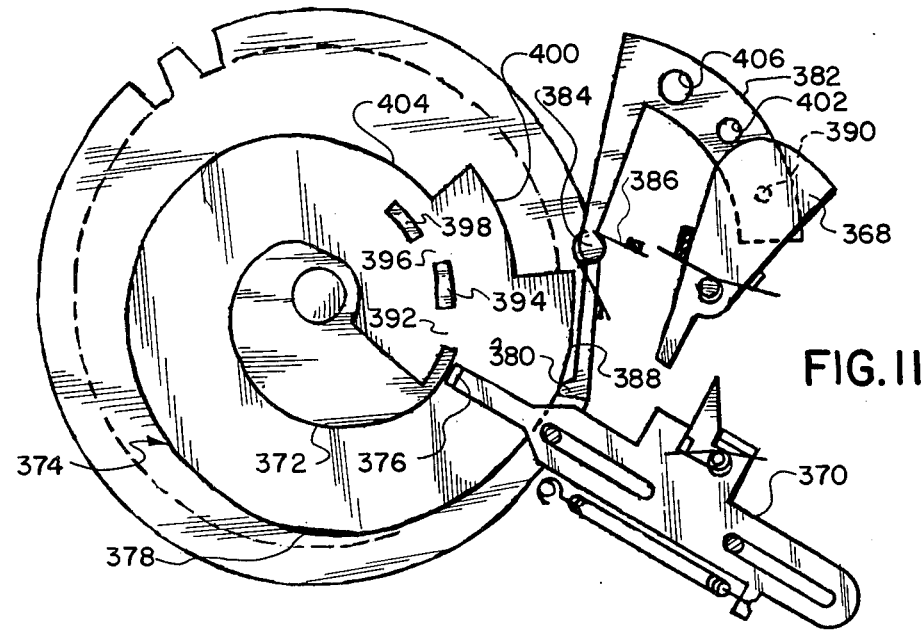
Figure 15:
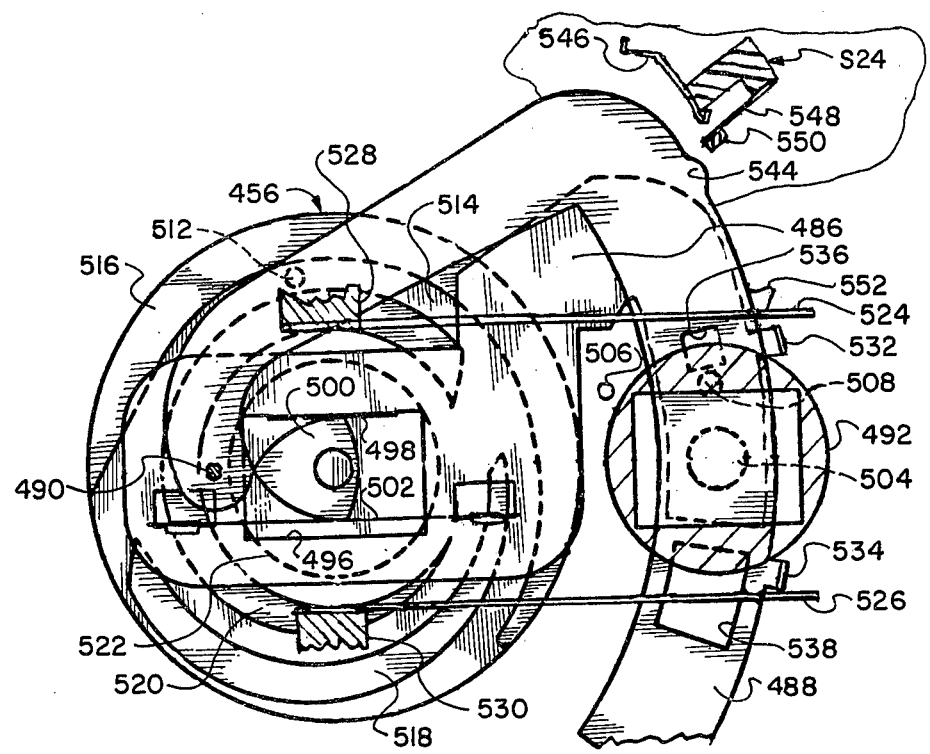
Figure 16:
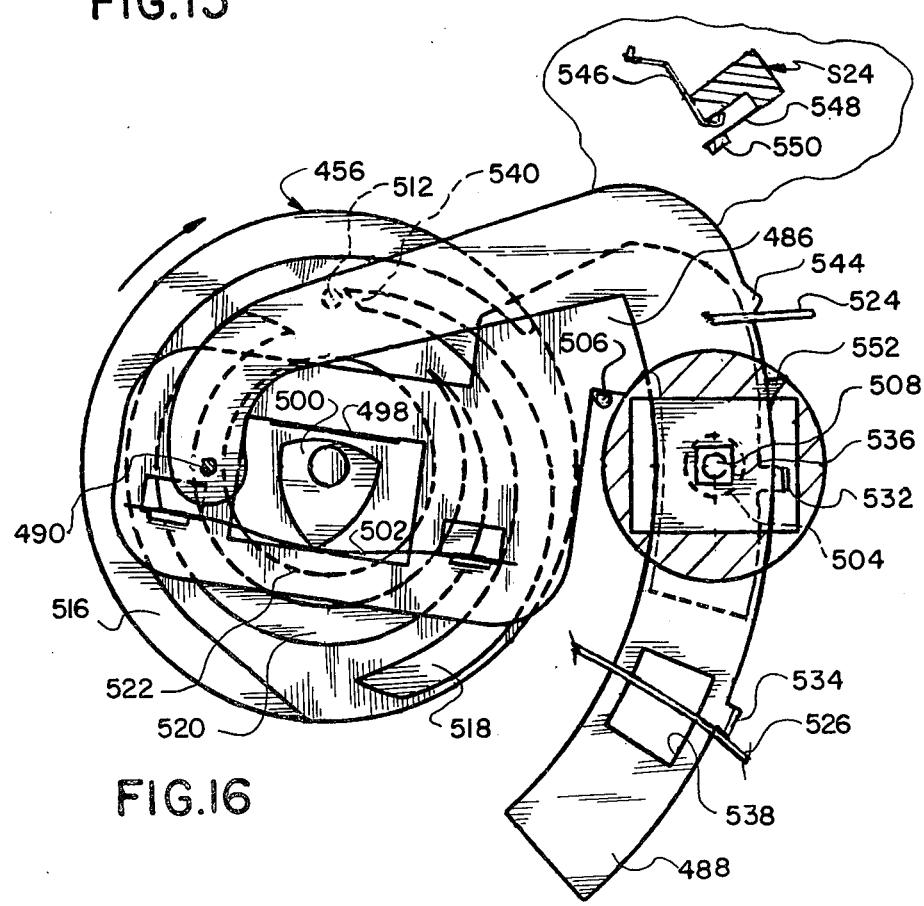
Figure 17:
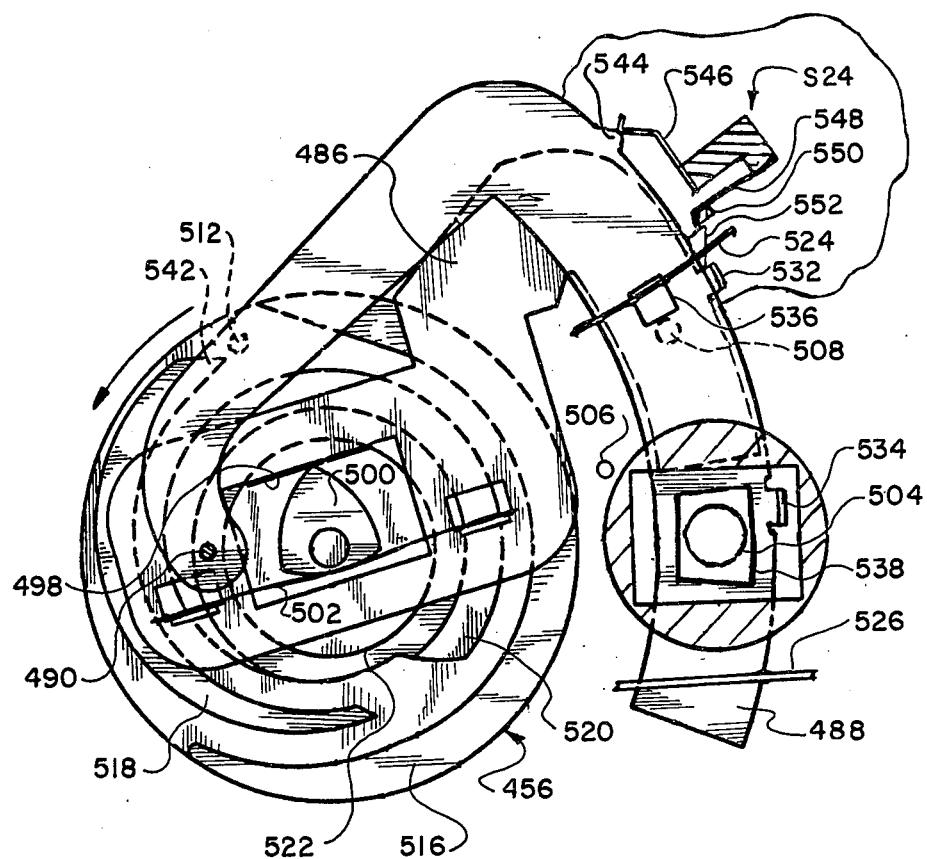

FIGS. 9a through 9d comprise a somewhat simplified logic flow chart depicting the automatic sequencing of various camera operations under the control of the LCU shown in FIG. 8;

FIG. 10 is a front elevational view of an alternate version of the general type of shutter and aperture assembly shown in FIG. 6;

FIG. 11 corresponds generally to FIG. 10 but shows still another alternate version of a shutter and aperture assembly of the general type shown in FIG. 6;

FIG. 12 is a perspective view, partially in cross section, of a camera mechanism according to an alternate preferred embodiment of the invention which employs a planetary gear mechanism;

FIG. 13 is a front elevational view of the cam member of the mechanism shown in FIG. 12, showing the manner in which that member controls the application of pressure to the cartridge pressure plate and the momentary retraction of the film metering pawl;

FIG. 14 is a side elevational view showing the manner in which the film metering pawl is engaged by the mechanism depicted in FIG. 13;

FIG. 15 is a view similar to FIG. 13 showing the respective positions of the shutter and aperture members controlled by the cam member when the latter member is in its terminal position;

FIG. 16 corresponds to FIG. 15 and shows the respective positions of the depicted components during a high EV exposure; and FIG. 17 corresponds to FIGS. 15 and 16 and shows the respective positions of the depicted components during a low EV exposure.

DESCRIPTION OF THE ILLUSTRATIVE PREFERRED EMBODIMENTS

Figure 3:
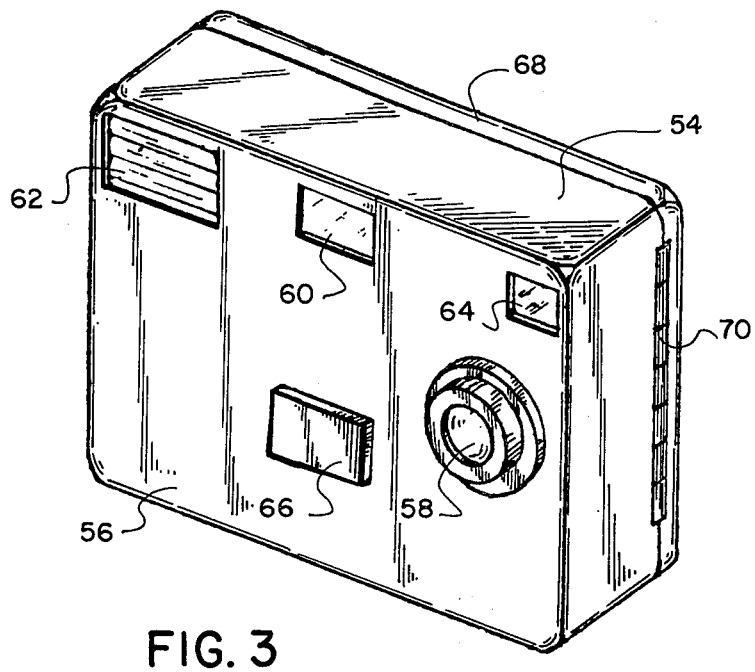
FIG. 3 is a front perspective view of an illustrative camera incorporating the invention.
Figure 4:
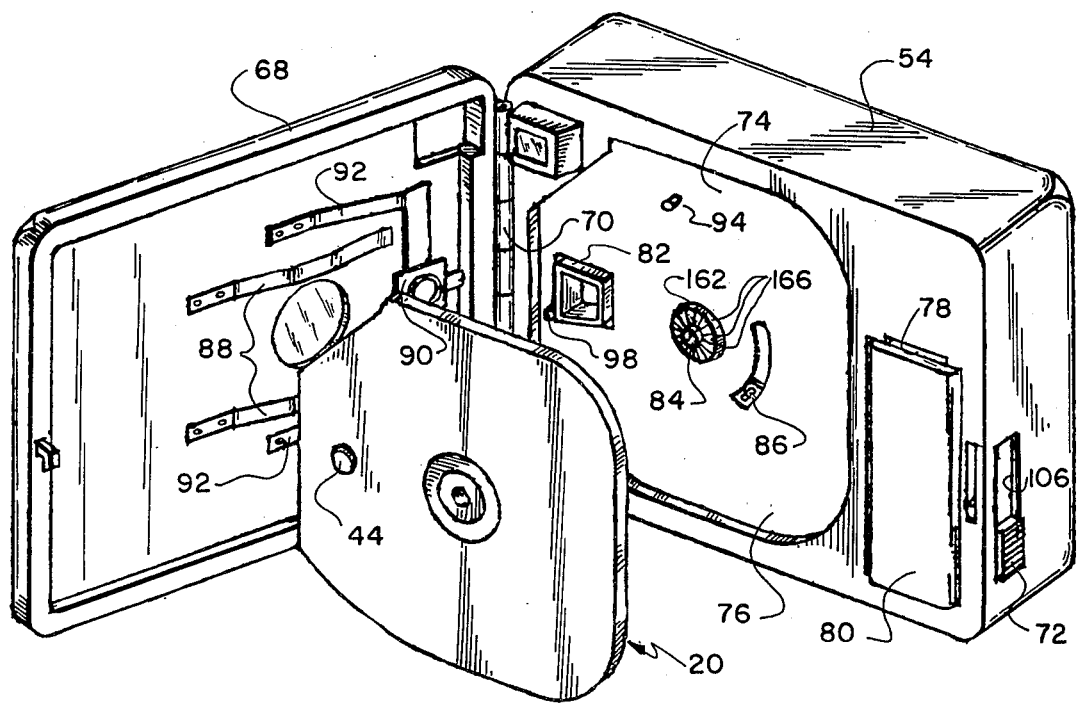
FIG. 4 is a rear perspective view of the camera shown in FIG. 3, depicting the camera's loading door in an open position and showing a film cartridge in position for loading into the camera.

Although the present invention is applicable to various kinds of cameras, the illustrative embodiments are directed to cameras adapted to use disk film cartridges of the type disclosed in copending U.S. patent application Ser. No. 118,272, now U.S. Pat. No. 4,268,145, entitled FILM CARTRIDGE ASSEMBLY, filed on Feb. 4, 1980, in the names of F. W. Harvey et al. Further details of specific features of such cartridges are disclosed in commonly assigned U.S. Pat. No. 4,194,822, entitled PHOTOGRAPHIC FILM CARTRIDGE AND CAMERA, issued in the name of G. S. Sethi on Mar. 25, 1980. To simplify understanding the environment in which the present invention is disclosed, such a film cartridge is shown in FIGS. 1 and 2 and a camera in which it is used is depicted in FIGS. 3 and 4.

General Description of Cartridge and Camera

Figure 1:
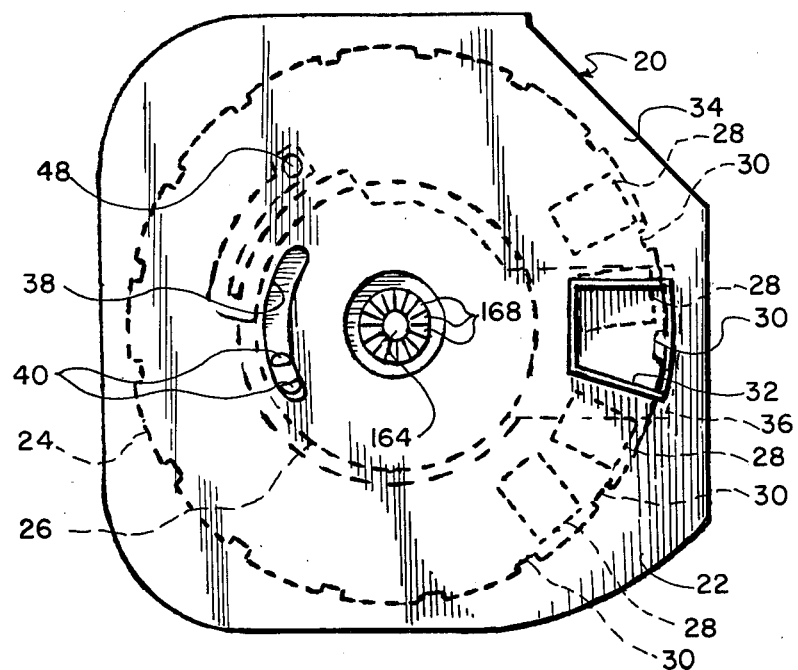
FIG. 1 is a front elevational view of a film cartridge of the type preferably used by a camera incorporating the invention.
Figure 2:
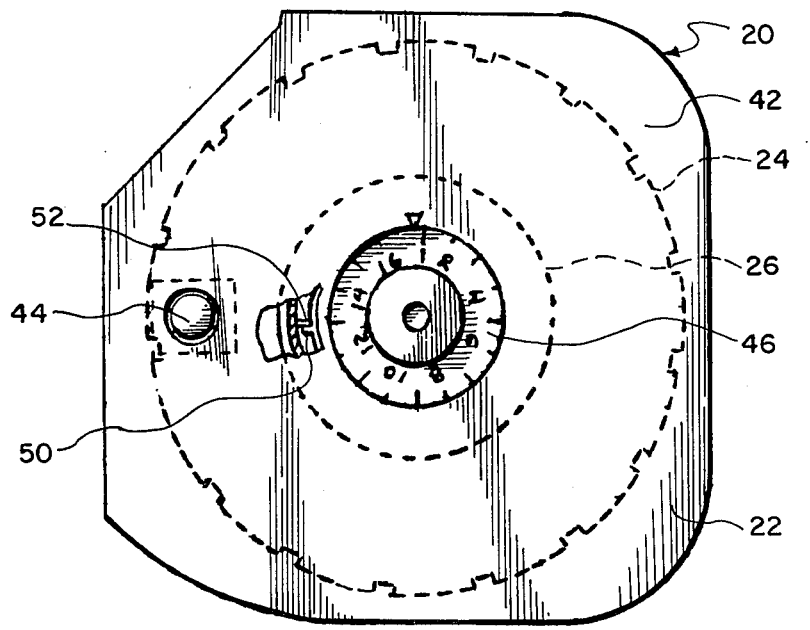
FIG. 2 is a rear elevational view of the film cartridge shown in FIG. 1.

The film cartridge 20 shown in FIGS. 1 and 2 comprises a generally flat light-tight plastic housing 22 enclosing a rotatable disk of film 24 provided with a central hub 26 that is accessible from the exterior of the housing. The film disk is provided with a plurality of uniformly spaced exposure regions 28 defined by previously exposing the surrounding portion of the film. Each of the exposure regions is associated with a corresponding adjacent metering notch 30, located along the edge of the film disk in a clockwise direction from the respective exposure region, as viewed in FIG. 1. An exposure winding 32 in the front wall 34 of cartridge housing is provided with a cover slide 36 that is pivotably movable into and out of alignment with the exposure window by means of a camera element that extends through a light-tight arcuate housing slot 38 and is received between two studs 40 on the cover slide. The rear wall 42 of the housing includes a pressure plate member 44 and an exposure counter dial 46 on the corresponding face of the film disk hub.

When the cartridge is loaded into the camera, a pin in the camera enters light-tight opening 48 in the front cartridge wall and releases a locking device, not shown, that initially locks the cover slide 36 in alignment with window 32. Initially, as viewed in FIG. 1, the film disk is located in its extreme counterclockwise position, defined by the engagement of the hub ear 50 with the lower edge of cartridge ear 52, from which position the film disk must be rotated in a clockwise direction through an angle equal to approximately ½ the angle between adjacent image areas to bring the first available image area into exposure position. Similarly, when the film disk has rotated through somewhat less than 360 degrees to its extreme clockwise position, after exposure of all of the image areas, the engagement of hub ear 50 with the upper edge of cartridge ear 52 locates the last exposure area clockwise of the exposure window by an angle equal to approximately ½ the angle between successive exposure areas.

Figure 5:
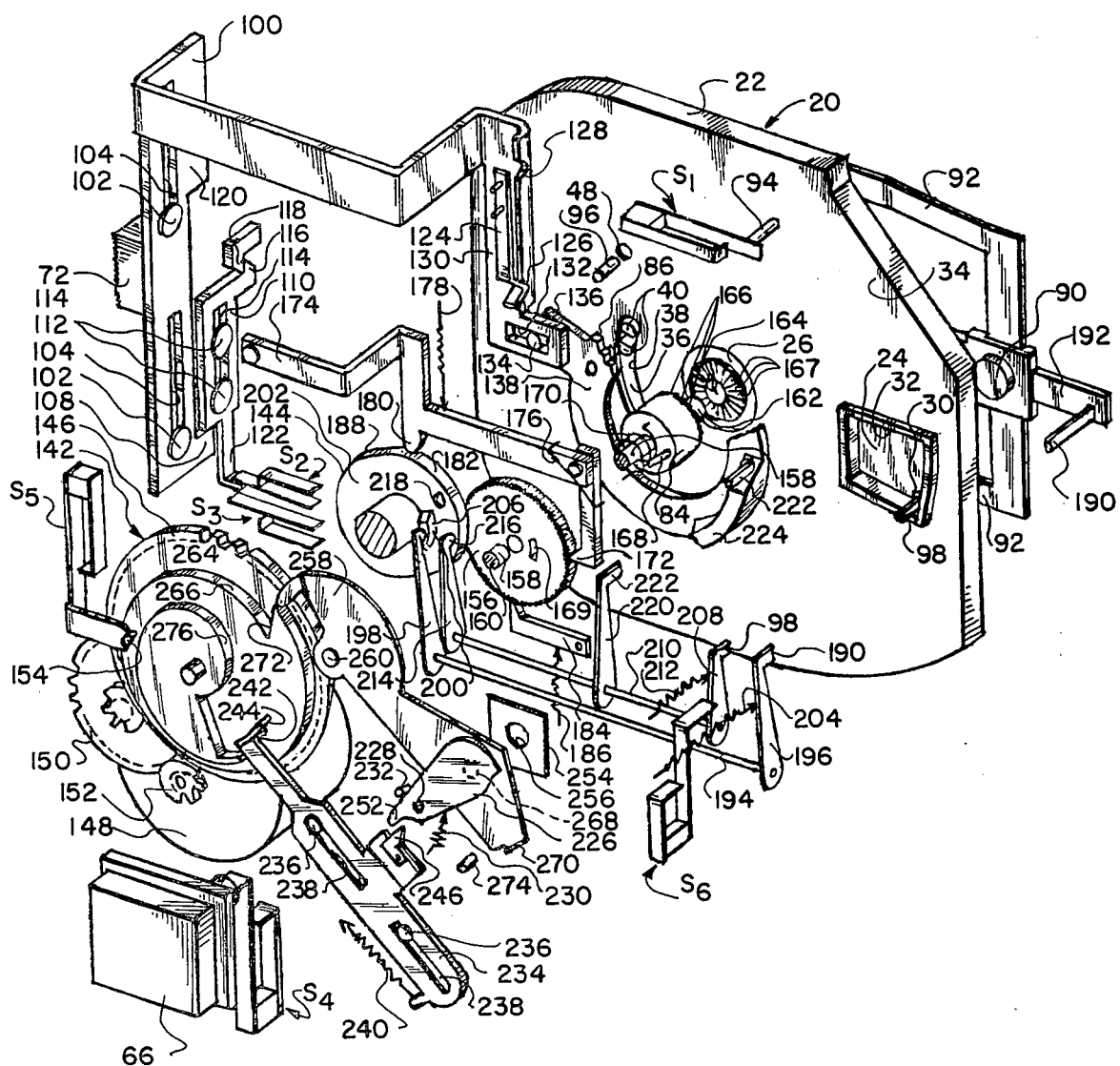
FIG. 5 is an exploded perspective front view of the internal mechanism of the camera shown in FIGS. 3 and 4, which comprises one preferred embodiment of the present invention.

The camera shown in FIGS. 3, 4, and 5 comprises a body 54 in the form of a relatively thin vertically disposed box. As shown in FIG. 3, the front wall 56 of the camera body is provided with an objective lens 58, a photocell window 60, an electronic flash unit 62, a viewfinder window 64, and a shutter release button 66. Additionally, the camera can be provided with a movable lens cover door, not shown, as is well known in the art.

FIG. 4 shows the camera's rear loading door 68, which is hinged to the camera body at numeral 70 and held in its closed position by a latch that is releasable by means of slide button 72. When the loading door is open, as shown in FIG. 4, the film cartridge is insertable into cartridge chamber 74, in which the front wall 34 of the cartridge lies adjacent intermediate camera wall 76, located rearwardly of the major components of the camera mechanism to which the present invention is directed. Adjacent the film cartridge chamber is a battery compartment 78, which is also accessible when the door is open to allow replacement of battery 80. When the cartridge is loaded into the chamber 74, a film support frame member 82, aligned with the camera lens, is received in the exposure window 32 of the cartridge. A driving member 84 engages the hub of the film disk, and slide operating pin 86 enters slot 38 to engage the cover slide. Closing the cover door causes its spring members 88 to seat the cartridge against the intermediate wall member and brings a pressure applying member 90, supported by spring arms 92, into alignment with the cartridge pressure plate member 44. Simultaneously, the cartridge depresses switch pin 94, closing normally open cartridge sensing switch S1, shown in FIG. 5. Additionally, unlocking pin 96 on the intermediate wall enters the previously mentioned light-tight opening 48 in the front cartridge wall, and releases the cover slide locking device. As will be described in detail later, latching of the door causes slide operating pin 86 to move the cover slide out of alignment with the exposure window so that the exposure region of the film disk can be supported against frame member 82 by the pressure plate under the influence of the pressure applying member. When the cover slide is open, a metering pawl tooth 98, extends through the exposure window and engages the periphery of the film to control its incremental rotation. After the film disk has been exposed, the process by which the cover door is unlatched first withdraws the metering pawl tooth from the exposure window and moves the cover slide to close the exposure window. This occurs before the door can be opened, thereby preventing accidental light damage to the exposed film. As the cartridge is removed, cartridge sensing switch S1 opens and unlocking pin 96 withdraws from the cartridge opening 48, thus allowing the locking device to again lock the cover slide in its closed position.

Because the present invention is not directed specifically to the camera features mentioned above, the foregoing explanation should be sufficient for clarifying the general environment in which the illustrative preferred embodiments are intended for use, and it should be understood that those features and other conventional features useful with the present invention can take various forms well known to those skilled in the art or described in various prior art references. For example, various disk film camera features, including some of those features described above, are shown in greater detail in U.S. Pat. No. 4,202,614, entitled PHOTOGRAPHIC CAMERAS, issued to Donald M. Harvey on May 13, 1980. Accordingly, the following description of specific illustrative embodiments of the present invention will be directed in particular to those elements forming part of or cooperating directly with the camera structures to which the present invention is specifically directed.

Mechanism of Embodiment Shown in FIGS. 3–5

In FIG. 5, the principle mechanical components of the embodiment of the invention shown in FIGS. 3, 4, and 5 are shown in exploded perspective relation to each other and to a film cartridge 20, depicted in the position that it assumes in the camera. The door latching mechanism, mentioned above, comprises a slide member 100 supported by rivets 102 extending through slots 104, and slide button 72, which projects through a slot 106 in the camera housing, as shown in FIG. 4. When the slide member is in its depicted latched position, its lower ear 108 engages the lower edge of latch slide 110, slidably supported by rivets 112 extending through slot 114, to maintain hook 116 of the latch slide in latching engagement with hook 118 on the cover door. When the slide member is moved to its unlatching position, defined by the abutment of rivets 102 with the upper ends of slots 104, upper ear 120 of the slide plate has engaged the upper edge of the latch slide and has disengaged latch slide hook 116 from cover door hook 118. When the door is latched, finger 122 on the latch slide closes a normally open switch S2 and, whenever the door is unlatched, the same finger closes a normally open switch S3. A detent spring 124 is engageable with notches 126 and 128 in the slide member arm 130 to retain the latter in its respective latched and unlatched positions. A slot 132 in arm 130 receives a pin 134 on finger 136 of cover slide adjusting ring 138, which is supported, by means not shown, for rotation about its axis. The previously mentioned slide operating pin 86 is carried by ring 138 and engages the cover side of the cartridge to open and close that slide. In FIG. 5, pin 86 is shown in the position in which the cover slide is fully open. As the slide button is moved downwardly to unlatch the cover door, arm 130 rotates ring 138 in a counterclockwise direction to close the cover slide. Because of the lost motion provided between the slide plate and the latch slide by ears 108 and 120, the cover slide will be completely closed before the door is unlatched and switch S3 is closed. Similarly, when a new cartridge is loaded into the camera, its cover slide is fully opened by the upward movement of the slide before the door is latched and switch S2 is closed. If desired, means could be provided whereby the slide member is releasably held in its unlatched position in opposition to a spring and released to latch automatically when the cover door is closed, in the manner shown, for example, in U.S. Pat. No. Re. 26,181.

A rotatably supported cam assembly 140, comprises cam wheels 142 and 144, which are connected in fixed relation to each other. A gear 146, integral with cam wheel 142, is coupled to a bi-directionally operable motor 148 through compound reducing gear 150 and motor pinion 152. Accordingly, the motor drives the cam assembly in the same direction as the motor rotates, but at a greatly reduced angular velocity. The cam assembly is illustrated in its terminal position, i.e. the rotational position that it assumes after the completion of a film advancing and shutter cocking operation but prior to the subsequent actuation of the shutter release button 66, which closes normally open switch S4. The terminal position of the cam assembly is established by the opening of normally closed switch S5 when that switch is engaged by lug 154 on cam wheel 142.

Laterally adjacent and rearward of cam wheel 144, a ratchet wheel 156 is rotatably mounted on cantilevered shaft 158, which is supported at its forward end 160 by means not shown. The enlarged rearward head 162 of shaft 158, also shown in FIG. 4, extends into the film cartridge chamber and is received in the central hole 164 of the cartridge hub to define the axis of rotation of the film disk.

Forwardly of the enlarged head of shaft 158, driving member 84 is rotatably and slidably supported on the smaller diameter portion of the shaft. The driving member includes teeth 166 engageable with corresponding teeth 167 on the film disk hub to provide rotational hub driving engagement between the driving member and the film disk. The number of equally spaced teeth on either the driving member or the hub should be at least as great as the number of available exposures on the film disk to minimize lost motion if those two members are initially angularly misaligned so that their teeth are out of driving engagement with one another, but it is not essential that both members have a complete set of teeth. In other words, if the hub has fifteen teeth, the driving member might have only three teeth spaced 120° apart.

A pin 168 extending forwardly from driving member 84 is received in an arcuate slot 169 in ratchet wheel 156 to limit the relative angular movement between the driving member and the ratchet wheel to an angle less than that subtended by a single image area on the film disk, but greater than that subtended by a film disk notch. A combined torsion and compression spring 170 encircles shaft 158 and is connected at its opposite ends to driving member 84 and rachet wheel 156. Spring 170 urges the driving member toward the cartridge but allows it to be moved forwardly by the cartridge hub if the teeth of the driving member and the hub are angularly misaligned when the cartridge is initially loaded into the camera. Additionally, spring 170 urges the driving member clockwise relative to the ratchet wheel, limited by the reception of pin 168 in slot 169, and transmits rotation of the cam assembly to the driving member.

The ratchet wheel 156 is provided with at least several times as many teeth as there are exposure regions on the film disk and is engaged by an advancing pawl 172, which is pivotally carried by a pivoted advancing lever 174 and biased into engagement with the ratchet wheel by spring 176. The advancing lever is biased in a clockwise direction by a spring 178 to urge the advancing pawl downwardly and to urge cam follower ear 180 of lever 174 toward engagement with edge cam surface 182 on the periphery of cam wheel 144. An anti-reverse pawl 184 is also engaged with the ratchet wheel under the influence of spring 186 to limit counterclockwise rotation of the ratchet wheel to an angle substantially equal to the angular width of the one ratchet wheel tooth.

Whenever the cam assembly makes a complete rotation in a clockwise direction, from its depicted position, as will be described in greater detail later, lobe 188 of cam surface 182 first causes advancing pawl 172 to ratchet upwardly past the adjacent teeth of the ratchet wheel as pawl 184 prevents the latter from rotating significantly in a counterclockwise direction and then allows the tooth to be moved downwardly by spring 178 to advance the ratchet wheel in a clockwise direction and thereby to impart similar rotation through spring 170 to the film disk. The range of movement of the advancing pawl, defined by cam lobe 188, is sufficient to advance the ratchet wheel through an angle equal to slightly more than twice the angular spacing between successive image areas of the film disk. Because the ratchet wheel is powered by spring 178 and the film disk is rotated by the ratchet wheel through spring 170, the film disk rotation can be blocked by the engagement of metering pawl tooth 98, with a metering notch in the film disk, as described later, without influencing movement of the cam assembly as it completes its rotation.

So that the film disk will be free to rotate in the cartridge without resistance or abrasion by the film supporting frame member 82, finger 190 engages ear 192 on the pressure applying member and holds the latter away from the cartridge during the film advancing movement of the cam assembly. During exposure of the film, however, finger 190 is retracted to allow spring arms 92 to urge the pressure applying member against the pressure plate. The movement of finger 190 is accomplished by means of a pivotally supported rod 194 that is provided at one end with an arm 196 supporting finger 190 and at its opposite end with an arm 198 provided with a cam nose 200. Cam nose 200 is urged toward cam surface 202 on cam wheel 144 by a spring 204 that is strong enough to overpower spring arm 92 supporting the pressure applying member. When cam nose 200 engages face lobe 206 of cam surface 202, finger 190 is withdrawn beyond engagement with pressure applying member ear 192 so that the pressure plate is activated by its spring arm 92. When cam lobe 206 is beyond engagement with cam nose 200, however, spring 204 causes finger 190 to deactivate the pressure applying member.

The metering pawl tooth 98 is carried by pawl member 208, which is mounted on a pivot shaft 210, and is lightly biased by spring 212 against the front surface of the film disk in alignment with the film metering notch thereof. The end of the pivot shaft opposite the pawl member carries an arm 214 provided with a cam follower nose 216 engageable by lobe 218 on the front face of cam wheel 144 to move the metering pawl tooth out of engagement with the film disk.

An arm 220, also mounted on pivot shaft 210, is provided with a cam follower finger 222 adapted to be engaged and displaced forwardly of cam lobe 224 on cover slide adjusting ring 138 to withdraw pawl tooth 98 from the cartridge window 32. This occurs during the initial cover slide closing movement of ring 138, before the cover slide has reached the pawl position and the pawl is maintained in its withdrawn condition until the opposite cover slide opening rotation of ring 138 has removed the cover slide from the cartridge window. Whenever the cover slide is in its fully open position, i.e. whenever slide button 72 is in its uppermost position with the door latched shut, cam lobe 224 is beyond engagement with finger 222 and has no influence on the film metering movement of the pawl member. To reduce frictional resistance to movement of the cover slide, an appropriate linkage could be incorporated in the mechanism so that the withdrawal of the metering pawl tooth by lobe 224 would also cause the pressure applying member 90 to disengage the film cartridge.

At the beginning of the first film advancing operation, after a new cartridge has been loaded into the camera, the metering pawl tooth 98 extends through the exposure window and rests against the film under the influence of spring 212. During the rotation of the cam assembly, after the pressure applying member has been displaced by finger 190, cam lobe 188 raises the advancing lever 174 and thereby the advancing pawl 172, as the ratchet wheel is prevented from rotating in a counterclockwise direction by anti-reverse pawl 184. During this upward movement of the advancing pawl, cam lobe 218 momentarily disengages the metering pawl tooth from the film disk and then immediately allows it to again engage the film disk. As the advancing pawl subsequently moves downwardly under the influence of spring 178, spring 170 is torsionally stressed and imparts rotation to the film disk through driving member 84. When the film disk has initially moved through an angle equal approximately to one third of the angle subtended by a single exposure region, the metering pawl tooth will fall into the metering notch associated with the first exposure region. This movement of the metering pawl opens normally closed switch S6 and physically blocks further rotation of the film disk, whereupon the cam assembly will continue to rotate to its terminal position as cam surface 182 is separated from cam follower ear 180 of the advancing lever. As the cam approaches its terminal position, after the film has been advanced, face lobe 206 displaces cam nose 200 of finger 198 to cause the pressure plate to urge the film against the film support member. Because the ratchet wheel is prevented from rotating in a counterclockwise direction by pawl 184, the torsional resilience of spring 170 continues to exert a clockwise force on the film disk so that the lower edge of the metering notch is resiliently urged against the metering pawl tooth to maintain the exposure region accurately in the exposure position.

If the teeth of the driver member and the pawl member were initially closely aligned with one another, the ratchet wheel would be arrested by the metering pawl after having moved through an angle of only slightly more than one-third the angle between successive exposure regions plus the small rotational angle required to torsionally tension spring 170. However, if more lost motion is initially present between the teeth of the driving member and the hub member, this additional lost motion must also be absorbed before the disk commences to rotate. Because the full range of motion of the advancing pawl is sufficient to move the ratchet wheel through an angle slightly greater than twice the angular spacing between successive exposure regions, the film can always be properly advanced by a single downward stroke of the advancing pawl, even if the driving member teeth and the hub teeth should initially be in point-to-point contact, thereby requiring the driving member to move through an angle equal to the angular spacing between successive exposure regions before the lost motion is absorbed and the film disk starts to rotate.

The exposure regulating mechanism shown in FIGS. 5 and 6 includes a shutter blade 226 pivotally mounted by stud 228 and biased by spring 230 to its closed position against pin 232, as shown in solid lines. A shutter operating slide 234 is slidably supported by pins 236 extending through slots 238 and is biased to the left by spring 240. Ear 242, projecting rearwardly from the left end of slide 234, is shown engaged with rail 244 of cam wheel 142, which retains the slide in its cocked position in opposition to spring 240. In this position, the slide closes normally open switch S7. Whenever the cam assembly is rotated in either direction from its terminal position sufficiently to move rail 244 beyond ear 242, spring 240 immediately drives slide 234 to its uncocked position, partially shown in dashed lines in FIG. 6, in which slide 234 engages and closes normally open switch S8. During such movement of the cam assembly, the pressure applying member remains in resilient engagement with the pressure plate to maintain the film exposure region in for exposure. A shutter driver finger 246 is pivotally mounted to slide 238 and is biased in a clockwise direction against a slide ear 248 by a weak spring 250. During movement of slide 234 by spring 240, the shutter driver finger engages lower ear 252 of the shutter blade and momentarily drives the blade to its open position before moving beyond engagement with that ear to allow the shutter to close under the influence of spring 230. During the recocking movement of the slide, which will be described later, shutter blade ear 252 rotates the shutter driver finger in a counterclockwise direction in opposition to spring 252 to permit it to bypass that ear.

An aperture plate 254, behind the shutter blade, includes an aperture 256 that defines the maximum aperture of the objective lens 58. Aperture blade 258, pivoted on stud 260, is located forwardly of the aperture plate but behind the shutter blade and is biased in a counterclockwise direction by spring 262 to maintain its cam follower finger 264 in contact with cam surface 266 of cam wheel 142. Whenever the cam assembly is in its depicted terminal position, cam surface 266 positions the aperture blade as shown in solid lines, with its aperture 268 in alignment with the larger aperture 256 in plate 254, thus reducing the effective aperture of the objective lens.

If the cam assembly is rotated in a counterclockwise direction from its terminal position to release the shutter, cam surface 266 does not alter the position of the aperture blade, in which its ear 270 is in the path of movement of the shutter blade to limit the opening movement of the blade to the position shown in dashed lines in FIG. 6. If, however, the cam assembly is rotated in a clockwise direction the cam follower finger 264 of the aperture blade has dropped past flank 272 of cam surface 266, before rail 244 moves beyond ear 242 to release the shutter. Accordingly, before the shutter is released, spring 262 has moved the aperture blade to the position shown in dotted lines in FIG. 6. In this position, the aperture blade has no influence on the effective aperture of lens 58 and the aperture blade ear 270 is beyond the path of movement of the shutter blade. The opening movement of the latter is now defined, as shown in dotted lines in FIG. 6, by an insulated stationary stop pin 274, which, together with the shutter blade itself, comprises a flash synchronizing switch S9. As is well known in the prior art, the exposure duration produced by such a shutter is proportional to the distance through which the shutter blade travels before rebounding. Thus, the subject mechanism provides two combinations of shutter speed and exposure aperture, to provide respective exposures having different exposure values (EV's). If the cam assembly is rotated counterclockwise to trip the shutter, the exposure is made with a small aperture and a short exposure duration (High EV). If the cam assembly is rotated clockwise to trip the shutter, the exposure is made with a larger aperture and longer exposure duration (Low EV) and is combined with synchronized flash ignition.

From the foregoing description, it should be apparent that the mechanism operates automatically through successive cycles, each of which comprises three phases; namely a film advancing phase, an exposure adjustment phase and a shutter releasing phase. The three phases are defined by corresponding ranges of movement of cam assembly 140 and are non-contemporaneous with one another. In this regard, it should be noted that although the aperture blade 258 is always moved to its depicted (High EV) position during film advancement, this movement is in the nature of a preliminary conditioning of the aperture blade but is not in any way responsive to luminance and is therefore not an "adjustment" in the sense in which that term is used with respect to an "exposure adjustment phase".

After an exposure has been made, cam wheel 142 rotates clockwise through substantially a complete rotation to its terminal position to advance the film disk and recock the shutter. Shortly after this rotation commences, but before the cam wheel performs any other function, cam lobe 206 moves beyond nose 200 of arm 198 so that spring 204 forces finger 190 against ear 192 of pressure applying member 90 to release the clamping force of the cartridge pressure plate on the film disk. When the cam wheel has rotated sufficiently to insure that its lobe 188 has engaged and begun to lift ear 180 of advancing lever 174, cam lobe 218 encounters cam follower nose 216 of arm 214 and withdraws the metering pawl tooth 98 from the film disk notch. Because the advancing lever is in the process of raising advancing pawl 172 upwardly, the ratchet wheel is not now subjected to the film rotating influence of spring 178. However, when the preceding film disk rotation was blocked by the engagement of the metering pawl with a film disk notch, spring 178 continued to rotate ratchet wheel 156 in a clockwise direction. This rotation continued until the relative rotation between the ratchet wheel and the driving member in opposition to spring 170 had brought the counterclockwise end of slot 169 into engagement with pin 168. Because the ratchet wheel is prevented from rotating in a counterclockwise direction by anti-reverse pawl 184, spring 170 now continues to urge the film disk in a clockwise direction even though advancing pawl 172 is moving upwardly. Accordingly, as soon as the metering pawl tooth 98 is removed from the film notch, spring 170 rotates the film disk clockwise through an angle, limited by slot 169, to move the notch beyond the pawl tooth. As the rotation of the cam wheel 144 continues, but before it has initiated the film advancing movement of the ratchet wheel, lobe 218 moves beyond cam follower nose 216 and allows spring 212 to urge the tip of the metering pawl tooth against the stationary film disk. The continuing rotation of the cam assembly then causes the advancing pawl to rotationally advance the film disk until the metering pawl tooth enters the next film disk notch to complete the film advancing operation. This mechanism therefore insures that the tooth is in engagement with the film disk before the next notch moves into alignment with the tooth, regardless of the speed at which the disk is advanced to its next exposure position. Thereupon, the cam assembly 140 continues its clockwise rotation and causes the pressure applying member to activate the cartridge pressure plate before the cam rotation is terminated.

Whenever the clockwise rotation of the cam assembly 140 commences, following an exposure, ear 242 of the uncocked shutter operating slide 234 rests against the small radius portion of spiral cam surface 276 on cam wheel 142. During the clockwise rotation of the cam assembly, that cam surface moves slide 234 somewhat beyond its cocked position and then moves beyond ear 242 as the cam approaches its terminal position; whereupon spring 240 moves the slide to its cocked position depicted by the engagement of ear 242 with rail 244.

GENERAL DESCRIPTION OF ELECTRICAL SYSTEM

Figure 7:
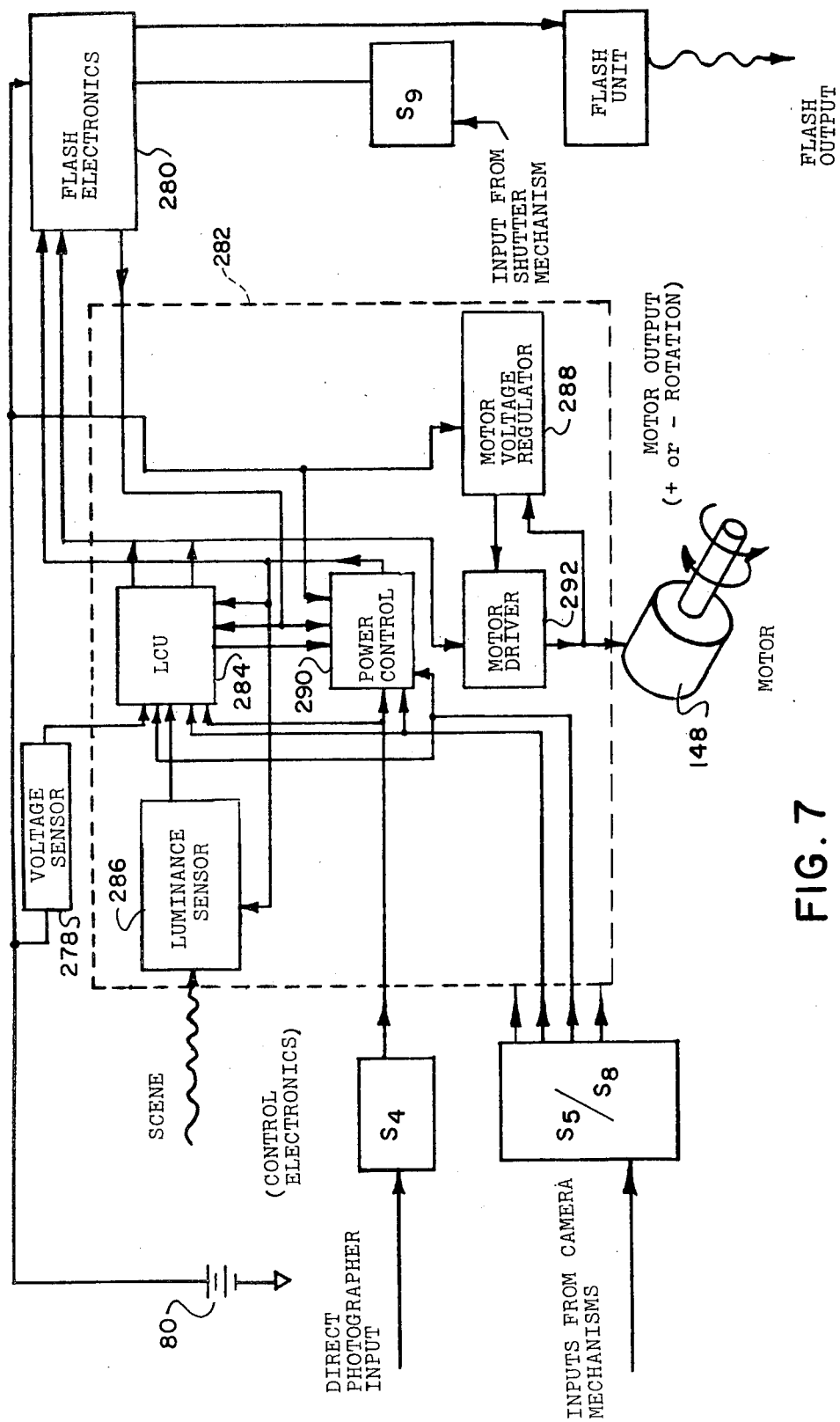
FIG. 7 is a block diagram illustrating the electrical circuitry of the camera shown in FIGS. 3 through 6.

The electrical system of the camera shown in FIGS. 5 through 8 is illustrated in block diagram in FIG. 7. In addition to the previously mentioned motor 148, battery 80 and switches S1 through S9, this system includes a voltage sensing circuit 278, a flash electronics circuit 280, and a control electronics circuit assembly 282. The control electronics circuit assembly, in turn, comprises a logic and control unit (LCU) 284, a luminance sensing circuit 286, a motor voltage regulator circuit 288, a power control circuit 290 and a motor driver circuit 292. All of the foregoing circuits are conventional and well known and could be designed or selected from prior art circuits by one of ordinary skill in the art. Accordingly, these circuits will be described only in terms of their respective functions. The LCU is likewise of conventional and well known design but will nevertheless be described in somewhat greater detail because of the central importance of that unit to controlling the various camera functions in properly interrelated sequence in accordance with a program stored in the LCU. It should be understood that in FIGS. 7 and 8, a single arrow or line may represent one or more wires or connections through which signals are transmitted.

LCU

As shown in FIG. 8, the LCU 284 includes a digital computer 294 comprising a central processor unit (CPU) 296, a temporary storage memory unit 298, a stored program memory unit 300, a timing and cycle control unit 302, input signal buffers 304, an input data multiplexer 306, an interrupt signal input 308 and output data buffers 310. Input data and signals in the form of logic level digital signals are derived from the various switches S2 through S8 and from other sensors, sensing circuits and analog to digital converters, not shown. These data and signals are received by input signal buffers 304 and are fed to the CPU through the multiplexer 306 under program control or through interrupt signal input 308. Logic level digital signals from the CPU are fed to output data buffers 310, also under program control. These output data buffers provide input signals to output drivers 312, e.g. motor driver circuit 292, which, in turn, provide amplified drive signals for directly or indirectly controlling the camera motor, viewfinder signals, flash operation, etc.

The stored program memory unit 300, which may comprise a conventional Read Only Memory, contains one or more operational programs which coordinate and control the operation of the CPU. Such a program includes instructions in the form of coded information that regulate the operation of the CPU. Any program stored in the stored program memory unit is permanent in the sense that it cannot be altered by the operation of the LCU or by manipulation of the camera. The temporary storage memory unit 298 comprises one or more conventional Read/Write Memories, which receive coded information, e.g. for a viewfinder display, and which store that information for later use until such time as it is erased. Also, the temporary storage memory unit can be used to temporarily store data being processed by the CPU and data representing the results of that processing.

The CPU "reads" stored instructions in a logical sequence determined by the operational program, and addresses the input ports through multiplexer 306 as required to obtain necessary inputs and to direct output signals through output buffers 310 to the appropriate output drivers 312. The CPU operations are very rapid but are sequential. i.e. the CPU fetches an instruction, performs the operations required by that instruction, fetches the next instruction, etc. Accordingly, precise timing of the activities of the CPU is essential. This timing is provided by the timing and cycle control unit 302, which includes an oscillator clock that provides precisely timed reference signal pulses by which all of the CPU activities are controlled. The CPU can also include one or more pulse counters, under program control, that can be used to establish relatively long reference periods during which a particular operation of the camera can continue.

From the foregoing, it will be apparent that the entire electronic system of the camera comprises conventional components arranged in a conventional manner. For example, digital computer 294 may take various forms, which are well known in the art as programmable microcomputers; e.g., the model 8048 microcomputer manufactured by Intel Corporation, Santa Clara, California.

The manner in which the various camera elements sequentially perform their respective functions is a function of the manner in which the digital computer is programmed. Programming of the computer is a conventional skill well understood in the art. For example, programming of the aforementioned microcomputer is described in "An Introduction To Microcomputers", Vol. II, published by Adam Osborne and Associates Inc., Berkley, Calif., 1977. Accordingly, the following description of the operation of the camera omits details of the computer program or programs, which depend on the architecture of the particular computer employed and the technique of the programmer, but is written to enable a programmer of ordinary skill in the art to produce an appropriate computer program. As an aid to understanding the illustrative camera operation, FIG. 9 is a somewhat abbreviated logic flow chart depicting the sequences of events and camera functions described below.

OVERALL OPERATIONAL SEQUENCE

To consider the overall operation of the camera in logical sequence, it will be assumed first that a completely exposed cartridge has been removed from the camera and a new cartridge has just been inserted into cartridge chamber 74. When the loading door 68 is closed and latched, the closing of switch S2 produces a signal pulse that is transmitted to the CPU through the interrupt signal processor. In response to this pulse, the LCU switches the power control unit from a dormant mode of operation to an active mode of operation at the point in the logic program shown at the top of FIG. 9a, and the program then proceeds from that point on. If the camera is provided with a lens cover door or the like, a similar switch causes the power control unit to assume its dormant mode whenever the lens is covered. In the dormant mode, power is supplied only to those circuit components that must remain energized to insure proper subsequent operation of the camera, but elements such as the flash electronics circuit and the motor driver circuit are disconnected from the battery to minimize current drain.

After the camera is restored to its active mode, if the temporary storage memory contains "exposed" or "empty" information, as will be described more specifically later, that information is erased or cleared. The LCU then interrogates switch S1 to determine whether or not a cartridge is present in the camera. If that switch remains open, indicating that the cartridge chamber is empty, the LCU causes the information needed to provide an "empty" signal to be entered in the temporary storage memory. Thereupon, switch S4 is activated and the power control unit assumes its dormant mode. When the shutter release button is subsequently depressed, this information will cause a warning signal to appear in the viewfinder. This may require temporary reestablishment of the active mode of operation for an interval limited by the timing and cycle control unit, but, as previously mentioned, the various camera functions can be programmed and executed in many different ways and the present explanation of the overall operation of the camera should be considered simply as illustrative.

If switch S1 is closed when the door is initially latched, indicating that a cartridge is present in the camera, the LCU instructs the motor driver to run the motor in a clockwise direction to advance the film disk to the first exposure position and to cock the shutter, which was previously uncocked as explained later. As the motor runs, switch S5 is interrogated until it opens, indicating that the cam assembly has made substantially a complete clockwise rotation and is at its depicted terminal position, whereupon the motor is deenergized to stop the cam assembly at that position. Then, the LCU interrogates switch S6 to determine whether the metering pawl has entered a notch in the film disk. If so, the LCU instructs the power control unit to activate the previously deactivated push button switch S4 to complete the loading phase of the camera operation and prepare the camera for the first exposure. If the pawl is not in a film disk notch, this indicates that the cartridge has previously been completely exposed and an "empty" signal is entered in the temporary storage memory unit as described later.

Whenever the battery voltage drops below a predetermined level, voltage sensing circuit 278 provides an interrupt signal to the LCU, in response to which the circuitry is switched to its dormant mode and information for providing a "replace battery" signal is stored in the temporary storage memory unit. When the shutter release button is subsequently depressed, the circuitry is temporarily switched to its active mode, if necessary, and the signal appears in the viewfinder for a predetermined length of time to alert the photographer to the malfunction. Alternatively, to provide a warning signal even if the battery is completely dead or absent, the low voltage signal or the absence of any voltage can deactivate an otherwise permanently energized liquid crystal mask in the viewfinder to render that mask transparent so that a "replace battery" signal is visible. The minute amount of current necessary to maintain the mask in its opaque state is inconsequential, and is restored when the voltage sensor detects a rapid rise in voltage above a predetermined level, which indicates that the battery has been replaced.

When the shutter release button 66 is depressed and closes switch S4, a pulse generator generates a signal pulse to initiate a film exposure operation comprising the following steps:

First the circuit is switched to its active mode, and the LCU then interrogates the temporary storage memory for stored warning information, e.g. "empty", "exposed" and "replace battery". If such information is present, corresponding signals are displayed for a limited time interval and the exposure operation is stopped. Subsequent depression of the push button will provide the same response until the fault is corrected. When the door is relatched after the cartridge and/or battery is replaced, this signal information is deleted from the temporary storage memory unit and the previously described loading cycle is repeated to prepare the camera for making exposure. If a fault still exists, e.g. if a fully exposed cartridge or a dead battery is still in the camera, the fault will be detected during the loading cycle and appropriate signals will again be displayed.

When the LCU determines that no warning signal information is present in the temporary storage memory, it interrogates the exposure sensing circuit to determine whether scene illumination is above or below a certain predetermined ambient luminance threshold level. If the scene luminance is above the threshold level, the LCU instructs the motor driver circuit to run the motor in a counterclockwise direction until switch S8 closes, indicating that the shutter has been released. Because the motor is run counterclockwise to release the shutter, the exposure is of relatively short duration and is made through the relatively small aperture 268, as previously described. Because the shutter blade rebounds from ear 270 of aperture blade 238, the shutter blade 226 does not encounter insulated stop pin 274, which serves as one element of the flash firing switch S9, so no flash illumination occurs.

If, on the other hand, the exposure sensing circuit determines that scene luminance is below the predetermined threshold level, the LCU instructs the flash electronics circuit to "refresh" the flash firing capacitor by charging it for a relatively short period of time, e.g. 250 msec. As will be apparent later, it is relatively unlikely that the flash capacitor will not already be substantially charged. Therefore, this short additional refreshing charge will almost always be sufficient to produce the required flash illumination. Although not shown in the logic flow chart, the LCU can interrogate the flash unit after the brief refreshing period to determine whether the capacitor is now adequately charged and, if not, can provide a warning signal, discontinue the exposure operation and charge the capacitor, which will then provide flash illumination when the exposure cycle is reinitiated by another depression of the shutter release button. After the brief capacitor refreshing interval, the LCU instructs the motor driver to run the motor in a clockwise direction until the closing of switch S8 indicates that the shutter has been released. Consequently, the exposure is of relatively long duration and is made through the relatively large aperture 256 and flash illumination is synchronized with the exposure by the momentary closing of switch S9, comprising shutter blade 226 and insulated stop pin 274.

When the closing of switch S8 indicates that the shutter has been released, regardless of which direction the cam was rotated for that purpose, the LCU stops the motor and causes the flash capacitor to be charged for a predetermined time interval sufficient to adequately charge it from a substantially discharged condition, whereupon the motor is run in a clockwise direction to advance the film disk and recock the shutter. If the preceding exposure was made by rotating the cam assembly in a counterclockwise direction to trip the shutter, switch S5 is closed before the succeeding clockwise rotation of the cam assembly commences and will almost immediately be opened when the cam assembly has rotated through a small angle back to its terminal position. However, this movement of the cam assembly will not have cocked the shutter or advanced the film disk. Accordingly, the LCU now monitors both switches S5 and S7 and does not terminate the motor rotation until the former switch is open and the latter switch is closed, which indicates that the cam assembly has made a complete rotation and is back at its terminal position, after having advanced the film and cocked the shutter.

After the motor has been stopped, the LCU interrogates switch S6 to determine whether the metering pawl has entered a film disk notch, as it will have if a new exposure area of the film disk is now in exposure position. If the switch indicates this to be the case, the LCU switches the power control unit to its dormant mode in preparation for the next exposure cycle. If, however, the preceding exposure was made with the last available film frame, the subsequent rotation of the cam assembly will have cocked the shutter but the film disk will only have rotated through one angle equal to about ⅓ the width of an exposure frame before the disk rotation is blocked by the engagement of hub ear 50 with cartridge housing pin 52. Therefore, even though the cam assembly makes a complete rotation, the metering pawl will not be received in a film disk notch. Accordingly, if the LCU senses that the pawl is not in a film disk notch after the cam assembly has completed a rotation and has cocked the shutter, the information for producing an "exposed" warning signal is stored in the temporary storage memory and such a signal is immediately displayed in the viewfinder for a predetermined interval. The LCU then interrogates switch S1 to determine whether the cartridge was removed during the display interval. If not, the power control assumes its dormant mode in preparation for the next depression of the push button 66, which will cause the signal to be displayed again. When the LCU detects that the cartridge has been removed, the motor runs in a clockwise direction to release the shutter and then stops. Thereupon switch S4 is deactivated so that depression of the push button 66 will have no influence until the control circuit has again completed its initial functions shown in FIG. 9a.

If the photographer unlatches the cover door to replace the cartridge at any other time during the operational sequence, the resulting closing of switch S3 provides the LCU with an interrupt signal that causes the LCU to instruct the motor driver circuit to run the motor in a clockwise direction until switch S8 closes. As just described, this causes the shutter to be released with the cam assembly moved only slightly beyond its terminal position. This supplemental shutter releasing operation leaves the shutter in an uncocked condition when the next loading phase of the camera cycle so that the initial rotation of the cam assembly can advance the first exposure frame into exposure position and can recock the shutter without first releasing the shutter and thereby exposing the film area initially aligned with the exposure window.

If the battery voltage should drop below the threshold level of the voltage sensing circuit after the shutter is cocked, which is not unlikely if the camera is not used for a long period of time, the cartridge can be removed but the shutter releasing operation cannot be performed automatically because of the absence of electrical energy. Accordingly, the voltage sensing circuit includes means whereby a rapid rise in voltage to a level above the threshold level reactivates the electrical circuit and produces an interrupt signal that initiates the supplemental shutter releasing operation in the same manner as if the camera door were unlatched. Because the door must be open to replace the battery, the cartridge cover slide is closed when the shutter is thus released, thereby preventing a faulty exposure.

After a supplemental shutter releasing operation is completed, regardless of whether it was initiated by the unlatching of the camera door or by replacement of the battery, the LCU switches the circuit to its dormant mode, in which it remains until the loading phase of the cycle is initiated by the relatching of the door. Although the loading phase was previously described in the context of loading a new cartridge in the camera, a partially exposed cartridge can be removed and reloaded into the camera in the same manner unless the lock mechanism of the cartridge is designed to preclude reopening of the cover slide.

As previously mentioned, the foregoing description of the illustrative camera's operation and the corresponding flow chart (FIG. 9) have been somewhat abbreviated to cover only the more essential operational steps. It will be obvious to one of ordinary skill in the microprocessor control art that the very fast operating speed of the microprocessor and the flexibility with which it can readily be programmed to perform different functions allow it to carry out additional steps to protect the camera and film unit against relatively unlikely malfunctions and also to perform additional operations, e.g. to display additional viewfinder signals, to provide automatic repetitive exposures, to make one or more exposures after a fixed or selectable time delay, etc.

FIG. 10 EMBODIMENT

FIG. 10 shows an alternate embodiment of a shutter and aperture control assembly usable in conjunction with the camera mechanism previously described. In this construction, the shutter blade 320, the shutter operating slide 322 and the shutter operating cam surface 324 of cam wheel 326 are substantially identical to the corresponding elements 226, 234, 266, and 142 described above, and are similarly illustrated with the cam wheel shown in its terminal position and with the shutter cocked. Rail 328, which holds the shutter operating slide in its cocked position, is likewise similar to the previously described rail 244 but is longer in a counterclockwise circumferential direction.

An aperture slide 330, provided with three progressively larger apertures 332, 334, and 336, is slidably supported by rivets 338 and 340 in slot 342 and lies against the face 344 of cam wheel 326. A light spring 346 biases the aperture blade to its depicted position, defined by the engagement of pin 340 with the right end of slot 342. In this position, the smallest aperture 332 is aligned with the optical axis of the objective lens and is covered by the shutter blade 326.

When the shutter release button is depressed, the exposure sensing circuit decides which of the apertures is required and, if the smallest aperture 332 is to be used, the cam assembly is driven counterclockwise to release the shutter without moving the aperture slide. If either of the other two apertures is required, the cam assembly is first rotated in a clockwise direction, which causes drive pin 348 on cam wheel 326 to engage the adjacent left end of aperture slide 330 and to move the slide to the right. To position the intermediate aperture in the optical path, the motor reverses after that aperture has moved slightly beyond the lens axis, whereupon spring 346 pulls the slide to the left to the position established by the engagement of slide notch 350 with tooth 352 of pawl lever 354, which is pivotally supported by stud 356 and lightly biased in a clockwise direction by spring 358. When the continuing counterclockwise rotation of the cam wheel moves rail 328 beyond ear 360 of shutter operating slide 322, the shutter is released as described previously. Similarly, if the largest is aperture is required, the initial clockwise rotation of the cam assembly continues until that aperture has been moved slightly beyond the optical axis, whereupon the slide is blocked in the proper position by the engagement of tooth 352 with notch 362 during the subsequent counterclockwise rotation of the cam that thereafter effects release of the shutter.

After the exposure is completed, the cam is again rotated in a clockwise direction to advance the film and recock the shutter and, during this rotation, drive pin 348 moves the aperture slide to the right beyond its maximum aperture position before the pin disengages the slide. When the pin disengages the slide, however, cam lobe 364 has engaged nose 366 of pawl lever 354 and has displaced that lever to hold tooth 352 away from the aperture slide so that the latter returns to its depicted position before lobe 364 moves out of engagement with lever nose 366. Accordingly, when the cam assembly stops at its terminal position, the film has been advanced and the various shutter and aperture adjusting elements are again in their respective depicted positions. Obviously, the profile of the film advancing cam 144 would have to be changed somewhat to accommodate the difference in length between rails 328 and 244 and that the three or more possible exposure settings would require a different exposure sensing circuit and somewhat different programming of the microprocessor. However, all such modifications appear to be obvious expedients which need not be described with greater specificity. It should also be obvious that means similar to those previously described could be provided to adjust the shutter speed according to the position of the aperture slide. Similarly, the aperture slide or its equivalent could be provided with a series of fine notches and could be used to adjust a continuously variable diaphragm and/or adjustable speed shutter, thereby providing as many steps of exposure adjustment as there are such notches. In the illustrated embodiment, the clockwise rotation of the cam wheel that moves the aperture slide to the required one of its three positions might be controlled merely by timing the motor operation. However, if more aperture and/or shutter speed selections were available, as just mentioned above, it would be particularly desirable to provide additional means for accurately sensing the rotational position of the cam wheel or the position of an adjusting member analagous to slide 330 to control the reversal of the motor when the latter has adjusted the exposure regulating device to its appropriate position.

FIG. 11 EMBODIMENT

FIG. 11 shows still another embodiment of a shutter and aperture adjusting device that uses a shutter blade 368, a shutter operating slide 370 and a cooperating cam surface 372 on cam wheel 374, which are generally similar to the corresponding elements previously described. In this embodiment, however, the terminal position of the cam assembly leaves the outermost portion of cam surface 372 in engagement with ear 376 of the shutter operating slide. The peripheral surface 378 of the cam wheel is engaged by nose 380 of a pivotally supported aperture blade 382, which is biased in a clockwise direction about pivot 384 by a spring 386. When the cam wheel is in its depicted position, the aperture blade nose is engaged with the outermost arcuate region 388 of wheel surface 378 to align the smallest aperture 390 of blade 368 with the lens axis. If the light sensing circuit calls for the smallest available aperture, the motor is given a relatively low voltage and short duration pulse of electricity to rotate the cam wheel clockwise relatively slowly and through only a small angle. Consequently, as the motor comes to a stop, ear 376 of the shutter operating slide will drop off the end of cam surface 372 and will pass through the opening 392 between that surface and rail 394 to release the shutter. During that operation, nose 380 of aperture blade 382 remains in contact with the outermost arcuate region 388 of wheel surface 378, whereby the exposure is made through the smallest aperture 390.

If the light sensing circuit indicates the appropriateness of the intermediate aperture, the motor is given a longer and higher voltage pulse of electricity, whereby the inertia of the shutter operating slide and the relatively fast movement of the cam wheel will cause ear 376 of slide 370 to miss opening 392 and engage rail 394 and then to drop through opening 396 between rails 394 and 398 as the motor coasts to a stop. By the time the cam wheel has moved rail 394 beyond the shutter slide ear 376, however, spring 386 has moved aperture blade nose 380 into contact with intermediate arcuate surface 400 of the cam wheel to position the intermediate aperture 402 in alignment with the lens axis. Finally, if the light sensing circuit senses the need for the maximum aperture, the motor driving pulse is of relatively high voltage and of still longer duration so that ear 376 of slide 370 fails to enter either opening 392 or 396 but engages and is released by rail 398 as the motor rotation is stopped; whereby aperture blade nose 380 is engaged with the innermost arcuate cam region 404 to locate the largest aperture 406 in the optical path during the exposure. Following the exposure, regardless of the aperture that was selected, the cam wheel is again rotated clockwise until it has returned to its terminal position and thereby advances the film and recocks the shutter.

General Description of Alternate Preferred Embodiment Illustrated in FIGS. 12-16

The film advancing and shutter operating mechanism illustrated in FIGS. 12-16, which comprises an alternate preferred embodiment of the invention, is usable in the same type of camera previously described and in cooperation with the same general type of electrical control circuitry and colateral mechanical devices, e.g. the mechanism for opening and closing the cover slide of the film cartridge. Accordingly, only this mechanism, per se, is illustrated, and the film cartridge is represented only by a fragmentary illustration of the film disk. Although this mechanism performs basically the same functions as the corresponding mechanism described above, it is structurally considerably different. Each of the mechanisms has advantages and disadvantages from the standpoints of complexity, compactness, versatility, manufacturing cost, and relative costs of mechanical and electrical components, etc., but, generally speaking, the former mechanism is probably better suited to relatively inexpensive cameras produced in fairly small volume and the latter to more expensive cameras produced in higher volume and in which compactness, smooth and quiet operation, and long term reliability are more important criteria.

Mechanism of Embodiment Shown in FIGS. 12-16

As shown in FIG. 12, which shows the depicted components as if the camera were lying on its back, the mechanism now being described includes a planetary gear transmission assembly comprising a film driving gear 420, a cam driving gear 422, a compound sun gear 424, a carrier gear 426, a compound planet gear 428, and a compound idler gear 430. The film driving gear is journaled in the intermediate wall member 432 of the camera housing and carries a central shaft 434. As in the case of the previously described shaft 158, the front end of shaft 434 is received in the film cartridge hub and rotatably and slidably supports driving member 436, which is connected to gear 420 by a combined tension and compression springs, not shown, which corresponds to the previously described spring 170. Also, the relative rotation between driving member 436 and gear 430 is limited by a device, not shown, corresponding to the previously described pin 168 and slot 169. The sun gear is rotatably supported on shaft 434 and, in turn, rotatably supports carrier gear 426. Compound idler gear 430 is journaled on pin 438 supported by the wall member 432. The larger gear element of the compound idler gear meshes with the smaller gear element of the compound sun gear and the smaller idler gear element meshes with the film driving gear. The larger gear element of the compound sun gear meshes with the smaller gear element of the compound planet gear, journaled on pin 440 of the carrier gear, and the larger element of the planet gear meshes with the cam drive gear carried by shaft 434. A combination intermediate gear 442 comprising a crown gear element and a spur gear element is journaled to the intermediate wall member by stud 444 with its spur gear element meshed with the carrier gear and its crown gear element meshed with pinion 446 of reversible drive motor 448. A pawl 450 is pivotally attached to the intermediate wall member by pin 452 and is urged against the film driving gear 420 by spring 454 to limit that gear to clockwise (film advancing) rotation.

Cam 456 is attached to the cam driving gear 422 and, as will be discussed in detail later, serves to adjust the aperture and shutter speed, to actuate the pressure applying member, to cock and release the shutter and to withdraw the metering pawl tooth from the notch in the film disk. The specific manner in which these functions are performed will be described in detail in connection with FIGS. 13-15, but for the present it will suffice to explain that the rotation of the film disk and the cam are non-contemporaneous, which allows the cam to rotate through a large angle to perform its various functions, thereby reducing tolerance requirements on cam surfaces and cam follower members and providing greater design flexibility to minimize the maximum torque requirements imposed on the motor.

As is well known in the gearing art, a planetary transmission of the type just described provides two outputs, namely cam driving gear 422 and film driving gear 420, either of which will rotate if the other is blocked. When rotation of the cam driving gear is prevented, clockwise rotation of carrier gear 426 causes the planet gear to orbit in the same direction with its larger gear element in mesh with the stationary cam driving gear, whereby the smaller element of the planet gear drives the sun gear in a clockwise direction but at a speed slower than that of the carrier gear. This clockwise rotation of the sun gear, in turn, drives the idler gear counterclockwise, which results in driving the film driving gear clockwise with the additional speed reduction afforded by the smaller planet gear element, the idler gear and the film driving gear. If the film driving gear is blocked, clockwise rotation of the carrier gear causes the planet gear to orbit counterclockwise with its small gear element in mesh with the stationary sun gear, which is blocked through the gear train just described, and thereby to drive the cam driving gear in a counterclockwise direction at a speed slower than that of the oppositely rotating carrier gear. Similarly, if the carrier gear is driven counterclockwise while the film driving gear is blocked, the cam driving gear will be driven clockwise with the same speed reduction relative to the carrier gear. Because of the different numbers of gears and gear tooth ratios involved in driving the film driving gear as compared to driving the cam driving gear, this mechanism provides a much greater reduction ratio between the motor and the former gear than between the motor and the latter gear. For example, the reduction ratio between the motor and the film driving gear may be on the order of 200 to 1 whereas the reduction ratio between the motor and the cam driving gear may be on the order of 20 to 1. Accordingly, it will be apparent that the film driving gear rotates more slowly and exerts a great deal more torque than does the cam driving gear.

At the beginning of a film advancing operation, a metering pawl tooth, described later, rests against the face of the film disk and the motor runs clockwise to drive the carrier gear clockwise. Because of the frictional rotational resistance imposed on cam 456 by the various mechanisms that it operates, the cam will therefore remain stationary as long as the film disk is driven in a clockwise (film advancing) direction. When the metering pawl enters a film metering notch, further clockwise rotation of the film disk is prevented and the opening of metering pawl switch S20 causes the motor to be deenergized. Before the motor comes to a stop, however, its inertia and that of the planetary transmission causes the film driving gear to rotate slightly further and thereby to tension the spring, not shown, connecting that gear with the film driving member. Because the film driving gear is prevented from rotating counterclockwise by pawl 450, the film disk remains under clockwise spring tension regardless of the direction in which the motor thereafter runs to impart rotation to cam 456. With the film disk thus prevented from rotating in either direction, subsequent energization of the motor will cause the cam to rotate in the direction opposite to that in which motor pinion 446 is rotating.

The rearward face of cam 456 is provided with a cam track 458, best shown in FIG. 13, that receives follower pin 460 of lever 462, which is pivotally supported by stud 464. When the cam is in its depicted terminal position, hook element 466, attached to the lever by a flexible spring member 468, is positioned beyond engagement with finger 470 of the film metering pawl 472, as best shown in solid lines in FIG. 14. Film metering pawl 472 is pivotally mounted to the intermediate wall member by pivot pin 474, as shown in FIG. 12 and is lightly biased by a spring 476 to urge the metering pawl tooth 478 toward the film disk 24. Whenever the lever 462 is in the position shown in solid lines, it opens switch S22, and its arm 480 operates a linkage, not shown, which displaces the pressure applying member out of engagement with the cartridge pressure plate in the same manner previously described. By the time the cam has rotated in either direction from its terminal position through an angle of approximately 75°, the resulting counterclockwise movement of lever 462 to the position shown in broken lines in FIG. 13 has allowed the pressure applying member to activate the pressure plate and the hook element 466 has been displaced to the position similarly depicted in FIG. 13. During this movement of the hook element, its rearward face 482 engages the adjacent end of the metering pawl finger 470 and the hook element cams past that finger by flexing spring member 468 forwardly. Lever 462 remains in this position until the cam has rotated through approximately 285°, whereupon it is returned to its former position as the cam completes its rotation. During this return movement, the pressure on the pressure plate is again relieved and edge 484 of hook element 466 catches the finger 470 of the metering pawl and momentarily pivots the pawl to the position shown in dotted lines in FIG. 14 before the hook element moves beyond engagement with the metering pawl finger. As previously explained, when the metering pawl tooth 478 is momentarily withdrawn from a film disk notch, the torsional influence of the spring connecting gear 420 with the film driving member immediately rotates the disk slightly in a clockwise direction so that the pawl tooth will then rest against the face of the film disk when the pawl member is disengaged by the hook element 466.

As shown in FIGS. 15, 16, and 17, an aperture blade 486 and a shutter blade 488 are pivotally mounted forwardly of cam 456 on a common pivot member 490 and pass through a guide member schematically illustrated in numeral 492. This guide member comprises a part of the mounting for the objective lens and is preferably integral with the film support frame structure 494, partially shown in FIG. 12, which corresponds to the previously described film support frame member 82.

The aperture blade 486 is provided with a central opening 496 bounded on one side by lip 498. A tri-cornered cam element 500 at the center of cam 456 is received in this opening and is engaged by a spring wire 502 on the aperture plate to urge lip 498 toward engagement with the adjacent surface of cam element 500. When the cam member is in its terminal position, as shown in FIG. 15, the free end portion of the aperture blade covers aperture opening 504 provided by the guide member 492 rearwardly of blades 486 and 488 and thereby prevents light from reaching the film.

When the cam member rotates in a clockwise direction from the position shown in FIG. 15, the aperture blade first moves counterclockwise (as viewed in FIGS. 15 through 17), and then reverses its movement so that it has assumed its extreme clockwise position, shown in FIG. 16, by the time cam member has rotated through approximately 230°. In this position, in which spring wire 502 urges the aperture blade against stop pin 506, aperture 508 in blade 486 is aligned with the lens axis to define the smallest available lens aperture. The aperture blade remains in this position until cam 456 is rotated through approximately 310°, whereupon it is returned to the position shown in FIG. 15. If the cam rotates in a counterclockwise direction from its terminal position, blade 486 first moves to its extreme clockwise position and then reverses its movement so that the free end portion of the blade is beyond aperture 504, as shown in FIG. 17, during the rotation of the cam between approximately 230° and 310°. Accordingly, during this interval, aperture 504 defines the maximum lens aperture. As the cam completes its rotation, the blade again returns to its former position shown in FIG. 15.

The shutter blade 488 is provided with a follower pin 512 received in a cam track 514 defined by ribs 516, 518 and 520 and by the circular central boss 522 on the forward face of cam 456. Two spring wires 524 and 526 are rigidly mounted to the camera, as schematically indicated at respective numerals 528 and 530, with their respective free ends in engagement with corresponding ears 532 and 534 on blade 488, whereby the latter is biased to its central position shown in FIG. 15. In this position, guide member aperture 504 is obstructed by the portion of the shutter blade between a relatively small rectangular exposure opening 536 and a relatively large rectangular exposure opening 538.

When the cam is rotated in a clockwise direction to provide a relatively large exposure value (EV) exposure, i.e. under relatively high scene luminance conditions, the cam track will move follower pin 512 toward the center of cam 456 and thereby will move the blade in a clockwise direction in opposition to spring 526 so that the smaller exposure opening 536 will have moved past the fixed aperture 504 of the objective lens before the cam has completed 280° of rotation. Because of the timed relation between the movement of the shutter blade and the aperture blade, the latter blade obstructs the light path as the exposure opening of the shutter blade moves past and beyond the light path, whereupon the aperture blade positions its smallest aperture 508 in that path. As the cam rotates beyond its 280° position, the tip 540 of cam rib 518 disengages pin 512, which allows spring 526 to move the shutter blade rapidly back to its initial position. During this movement, the smaller exposure opening 536 is momentarily aligned with aperture 508 along the lens axis to provide a short interval minimum aperture exposure. The final rotation of the cam 456 then returns the aperture blade to its light blocking position shown in FIG. 15, momentarily withdraws the metering pawl and relieves the pressure plate to complete the operating cycle.

When the cam is rotated in a counterclockwise direction to provide a relatively low EV exposure, the cam track moves pin 512 toward the periphery of the cam and thereby moves the shutter blade in a counterclockwise direction in opposition to spring 524 so that the larger exposure opening 538 will have moved beyond the light path before the cam completes 280° of rotation. While the large aperture is traversing the light path, the aperture blade again protects the film from light and then moves completely beyond aperture 504. When the cam has completed approximately 280° of rotation in the counterclockwise direction, the tip 542 of cam rib 518 disengages follower pin 512, which allows spring 524 to move the shutter blade rapidly in a clockwise direction back to its initial position, thus providing a relatively long duration maximum aperture exposure; whereupon the final rotation of the cam again restores the aperture blade to its initial position, retracts the metering pawl and relieves the pressure plate.

As the larger exposure opening traverses fixed aperture 504, a nose 544 on the shutter blade contacts switch blade 546 of a flash synchronizing switch S24, comprising that switch blade and the shutter blade itself, which is insulated from other electrical components of the camera. To insure that the flash is fixed only during a low EV exposure, notwithstanding the fact that shutter blade nose 544 contacts switch blade 546 at other times during the operation of the shutter, switch S24 also includes a second contact blade 548. This blade includes an insulated tip 550 engageable by ear 552 on aperture blade 486 to move blade 548 into contact with blade 546 when the aperture blade is in its extreme counterclockwise position shown in FIG. 17. Because the aperture blade and the shutter blade are in these respective positions only during a low EV exposure, the electrical circuit from switch blade 458 through shutter blade 488 is completed only at that time, while the larger exposure opening is traversing aperture 504.

Although the foregoing description has implied that the cam 546 always returns to precisely the same initial position, from which the various angular positions previously recited are derived, it should be noted that the metering pawl is momentarily retracted, the pressure plate is relieved and all significant movement of the shutter and aperture blades is completed by the time the cam completes approximately 320° of rotation in either direction from the illustrated terminal position, regardless of its direction of rotation and before lever 462 has moved to its extreme clockwise position. Accordingly, switch S22, shown in FIG. 13, can also be utilized to terminate rotation of the cam at the completion of each operating cycle.

The electrical circuitry associated with the embodiment of the invention just described is substantially identical to that depicted in FIG. 8 except that significantly fewer sensing switches are required. This difference is attributable principally to the fact that the mechanism shown in FIGS. 12 through 17 performs the shutter cocking function after the film advancing function has been completed. Accordingly, if the mechanism fails to advance the film sufficiently to bring an unexposed film region into exposure position, e.g. after the last exposure region has been exposed, this failure is sensed by the concurrent closed states of switches S20 and S22 before the shutter is cocked and cam 456 can be returned to its terminal position without operating the shutter. In the embodiment described earlier, however, returning the cam assembly to its terminal position after such a failure requires the intervening step of releasing the shutter, which, in turn, must be performed only when the cartridge cover slide is closed.

The various automatically sequenced operations of the camera incorporating the mechanism now being considered is described by the following summary of the various electrical system inputs and outputs and of the "logic" by which the various camera operations are monitored and controlled. It should be understood that this form of description, which is often used in the computer art, is simply a shorter and somewhat more detailed alternative to the narrative form of description used in conjunction with a logic flow chart to describe the embodiment of the invention depicted specifically in FIGS. 5 through 9. In other words, the two different modes of description are used for the convenience of readers having different technical backgrounds but do not imply that the respective systems are basically different.

I Inputs to Electronic System
  I 1. Switch Inputs
    I 1. 1. Power Switch Input: A mechanism causing a power switch (similar to S-1) to be "open" when:
      I 1. 1. 1. The loading door 68 is open OR
      I 1. 1. 2. A lens cover door (not shown) is closed
    I 1. 2. Shutter Release Switch Input: A mechanism causing the shutter release switch (equivalent to S-4) to be "closed" when the shutter release button is actuated and to be "open" when the shutter release button is released.
    I 1. 3. Flash Synchronizing Switch Input: A mechanism causing the flash synchronizing switch S-24 to be "closed" when the shutter is fully open (LowEV/Flash exposure only) and causing it to be "open" for all other conditions.
    I 1. 4. Metering Pawl Switch Input: A mechanism causing the metering pawl switch S-20 to be "open" when the metering pawl is received in a film disk notch and causing the switch to be "closed" for all other conditions.
    I 1. 5. Pressure Plate Switch Input: A mechanism causing the switch S-22 to be "closed" when pressure is applied to the pressure plate and causing the switch to be "open" when pressure is relieved.
    I 1. 6. "Wake-up" Switch Input: An involuntary user action causes a "wake-up" switch, not shown, to be "closed" prior to initiation of an exposure cycle, the intended result being completion of flash charging before an exposure cycle is initiated. The "wake-up" switch may be actuated by the photographer's grip on the camera, by camera motion, camera attitude, etc.
  I 2. Exposure Sensing Input: The scene brightness is sensed by exposure sensing circuit 286, which determines whether the brightness is within a LowEV/Flash zone (low brightness) or a HighEV zone (high brightness). A predetermined scene brightness defines the crossover point between the two zones.

II Outputs of Electronic System
  II 1. Motor Output: The motor shaft rotates in the (+) direction or the (−) direction (or doesn't rotate). As viewed in FIGS. 15 through 17, (+) rotation causes cam 456 to rotate counterclockwise and (−) rotation causes that cam to rotate clockwise.
  II 2. Flash Output: The flash output for a fully charged flash capacitor shall be sufficient to provide adequate flash illumination within a predetermined distance range under Low EV conditions and the capacitor shall be rechargeable to provide such an output within a time interval appropriate to the delays described below.

III "Main Flow" Logic
  III 1. When:
    III 1. 1. The Power switch "closes" OR
    III 1. 2. The "Wake-up" switch closes (this "or" condition applies where the "Wake-up" switch has been "closed" for a significant period of time and the system is in the shutdown state):
    III 1. 3. Controlled power is latched "on",
    III 1. 4. Flash charging is initiated, and
    III 1. 5. A controlled power delay (established by timing and cycle control unit 302) is initiated. This delay establishes a maximum "on" time for controlled power. If this delay times-out, controlled power is unlatched ("off"), terminating all system functions.
    III 1. 6. When:
      III 1. 6. 1. The flash capacitor is fully charged, (as sensed by a voltage detector in the flash electronics circuit 280) OR
      III 1. 6. 2. The lens cover door (if provided) is closed, OR
      III 1. 6. 3. The control power time delay times-out:
      III 1. 6. 4. Controlled power is unlatched ("OFF") (Flash charging inhibited).
  III 2. An exposure cycle is initiated and the commitment is irreversible (point-of-no-return) when: A transition in the shutter release button from the normal to the actuated state occurs and "closes" the shutter release switch after the previous exposure and film advancing cycle has been completed, which is indicated by the metering pawl switch being "open".
  III 3. When an exposure cycle is initiated (per III 2):
    III 3. 1. Controlled power is latched "on".
    III 3. 2. Flash charging is inhibited.
    III 3. 3. A light sampling delay (provided by timing and cycle control unit 302) is initiated. This delay establishes a time interval during which scene brightness is sampled and an EV decision is made and remembered (either LowEV/Flash or High EV).
    III 3. 4. A flash refreshing delay (provided by timing and control unit 302) is initiated. This delay establishes a maximum interval for refreshing the flash capacitor prior to initiation of the shutter release portion of the cycle, (applicable to a LowEV/Flash exposure only).
    III 3. 5. The controlled power delay is (re-)initiated.
  III 4. When:
    III 4. 1. The light sampling delay times-out AND
    III 4. 2. Sampled brightness is with the High EV zone.
    III 4. 3. Motor Output is (−) rotation. Go to Section III 6.
  III 5. When:
    III 5. 1. The light sampling delay times out AND
    III 5. 2. Sampled brightness is within the LowEV/Flash zone:
    III 5. 3. Flash charging is enabled
    III 5. 4. When:
      III 5. 5. 4. 1. The flash capacitor is fully charged OR
      III 5. 5. 4. 2. The flash refreshing delay times-out (whichever occurs first):
      III 5. 5. 4. 3. Motor Output is (+) rotation.
      III 5. 5. 4. 4. Flash charging is inhibited
    III 5. 5. When the shutter is fully open (Flash synchronizing switch S-24 "closed"), the Flash Output emits light.

III 6. When exposure has been completed (as sensed by the closing of switch S20 when the metering pawl retracts from the film notch):
  III 6. 1. Motor drive is terminated (motor coasts).
  III 6. 2. Flash charging is enabled
  III 6. 3. A flash charging delay (established by the timing and cycle control unit 302) is initiated. Note: This delay establishes a fixed time for charging the flash capacitor before advance is initiated.
  III 6. 4. The controlled power delay is re-initiated.
III 7. When the flash charging delay times-out;
  III 7. 1. Motor output is (+) rotation.
  III 7. 2. Flash charging is inhibited.
III 8. When advance has been completed (metering pawl enters a film notch and "opens" the metering pawl switch S-20):
  III 8. 1. Motor drive is terminated (motor coasts).
  III 8. 2. Flash charging is enabled.
  III 8. 3. The controlled delay is re-initiated.
III 9. Controlled Power is unlatched ("off") when:
  III 9. 1. Flash capacitor is fully charged OR
  III 9. 2. The lens cover door, (if provided) is closed (Power Switch "open") OR
  III 9. 3. The controlled power times-out.
IV Logic Associated with Special Considerations, Failure Modes, Etc.
  IV 1. Last Frame Logic: The logic specified here is contingent on the mechanism operating as follows: After the last frame is advanced to the point where the film disk can rotate no further (because of the engagement of hub ear 50 with cartridge housing ear 52), the subsequent initial rotation of cam 456 causes pressure to be applied to the pressure plate.
    IV 1. 1. When:
      IV 1. 1. 1. The metering pawl is not received in a film notch (Metering Pawl Switch S-20 is "closed") AND
      IV 1. 1. 2. Pressure is applied to the pressure plate (S-22 "closes"):
      IV 1. 1. 3. A memory element in memory unit 300 is "set"
      IV 1. 1. 4. The Motor Output becomes (−) rotation (motor drive is reversed, from (+) drive to (−) drive).
      IV 1. 1. 5. The maximum delay is re-initiated.
    IV 1. 2. When:
      IV 1. 2. 1. Pressure on the pressure plate is relieved (S-22 "opens") AND
      IV 1. 2. 2. The memory is in the "set" state (per Section IV 1. 1. 3):
      IV 1. 2. 3. Motor Drive is terminated.
      IV 1. 2. 4. Initiation of an exposure cycle is inhibited (this is implicit per the criterion of Section III 2, requiring that the metering pawl be in a film disk notch (S-20 "open") in order to initiate an exposure cycle).
      IV 1. 2. 5. Controlled Power is unlatched ("off")—shutdown state. Note: The shutdown state may occur a period of time after Sections IV 1. 2. 1. and IV 1. 2. 2. are fulfilled (i.e., when the controlled power delay times-out).
      IV 1. 2. 6. Flash charging is inhibited.
    IV 1. 3. The memory element of Section IV 1. 1. 3. is reset when Controlled Power goes from "off" to "on". Note: The "set" state of the memory element (Section IV 1. 1. 3.) is used to disable (+) rotation of the Motor Output, which would normally occur when/after the metering pawl is not received in a film disk notch AND pressure plate pressure is relieved (e.g., Ref. Section IV.3, 1st Frame Initialization).
  IV 2. Power Interrupt Recovery: The following describes the behavior of the system after power from the Power Source has been interrupted during an exposure cycle.
    IV 2. 1. If interrupt occurred at Section III.1 thru Section III.5 (inclusive): When Switched Power goes from "off" to "on", the response of the Electronic System shall be per Section III.1. An exposure cycle is initiated in the normal manner (per Section III.2). Note: The situation depicted here is one where an exposure (probably) has not occured (the metering pawl is still in a film disk notch). The pressure plate status is indeterminate (pressure may or may not be applied, depending on the specific point at which interrupt occurred). The acceptability of this situation assumes that the mechanism design is such that a mechanism "jam" cannot occur under any circumstances after power is re-applied.
    IV. 2. 2. If interrupt occurred at Section III.6 or Section III.7: when Switched Power goes from "off" to "on", the Electronic System shall pick-up the cycle at either Section III.6 or Section III.7 (either Section—an option). The following logic statement emphasizes the Section IV 2.2 requirement: When:
      IV 2.2. 1. The metering pawl is not received in a film notch (Switch S-20 "closed") AND
      IV 2. 2. 2. Pressure Plate pressure is relieved (S-22 "open"):
      IV 2. 2. 3. Motor Output becomes (immediately or after a delay) (+) rotation.
    IV 2. 3. If interrupt occurred at Section IV 1. 1: The Electronic System shall pick-up the cycle at Section IV 1.1. when Switched Power goes from "off" to "on".
  IV.3. 1st Frame Initialization: 1st Frame Initialization is implicit in the logic of Section IV 2.2. (stated briefly, the Motor Output is (+) rotation--after power is applied to the system---until the metering pawl enters the first film notch).
  IV.4. "Very-Low" Voltage protection: A "Very-Low" voltage condition is remembered when ("set" state):
    IV.4.1. Controlled Power Voltage drops below a predetermined threshold value
    The memory is reset when:
    IV.4.2. An exposure cycle is initiated (per Section III.2) Or
    IV.4.3. Controlled Power goes from "off" to "on". Charging of the flash capacitor is inhibited when the logic is in the "set" state.

It should be obvious that various viewfinder signals of the type previously described could be incorporated readily in the embodiment of the invention just described above and that the use of a microprocessor or analagous computer as a camera control element greatly simplifies providing such cameras with other features in addition to those specifically mentioned.

The invention has been described with reference to specific embodiments and variations, but it should be apparent that other modifications and variations can be made within the spirit and scope of the invention, which is defined by the following claims.

What is claimed is:

1. In a camera adapted to receive a film element that is advanceable incrementally to successive exposure positions, said camera including:
   (a) a motor;
   (b) control means for controlling the mode of performance of the motor;
   (c) an exposure regulating device adjustable in accordance with luminance; and
   (d) a shutter releasable from a cocked condition to produce an exposure, the improvement comprising:
      (1) first means operable for causing the motor to advance the film element received by the camera,
      (2) second means operable for translating a particular mode of performance of the motor into a corresponding adjustment of the exposure regulating device in accordance with luminance,
      (3) third means operable for causing the motor to release the shutter, and
      (4) sequencing means for operating said first, second and third means sequentially and non-contemporaneously.

2. The invention defined by claim 1 in which the control means includes luminance sensing means cooperating with logic means for controlling the mode of performance of the motor during operation of said second means.

3. The invention defined by claim 1 in which the exposure regulating device is adjustable to two different conditions in response respectively to operation of said motor in two different operating modes.

4. The invention defined by claim 1 in which, during operation of said second means, the exposure regulating device is adjusted by the motor to a predetermined condition in response to rotation of the motor in a predetermined direction.

5. The invention defined by claim 1 in which during operation of said second means, the exposure regulating device is adjusted by the motor to one predetermined condition in response to clockwise rotation of the motor and to a second different predetermined condition in response to counterclockwise rotation of the motor.

6. The invention defined by claim 1 in which, during operation of said second means, the exposure regulating device is adjusted by the motor in accordance with the distance through which the motor displaces at least one element of said second means.

7. The invention defined by claim 1 in which, during operation of said second means, the exposure regulating device is adjusted by the motor in accordance with the speed and duration of movement imparted by the motor to at least one element of the exposure regulating device.

8. The invention defined by claim 1 in which the exposure regulating device includes adjustable aperture defining means.

9. The invention defined by claim 1 in which the exposure regulating device includes means for adjusting the speed of the shutter.

10. The invention defined by claim 1 including motor control means for operating said motor always in the same rotational direction while said first means is operating, to advance said film element.

11. The invention defined by claim 1 including motor control means for operating said motor only in one predetermined direction while said third means is operating, to release said shutter.

12. The invention defined by claim 1 in which said motor causes the release of the shutter by operating said third means regardless of the direction of rotation of the motor.

13. In a camera adapted to receive a film element that is advanceable incrementally to successive exposure positions, said camera including:
   (a) a motor;
   (b) an exposure regulating device adjustable in accordance with luminance; and
   (c) a shutter releasable from a cocked condition to produce an exposure, the improvement comprising:
coordinating means selectively adjustable to:
      (1) an adjusting mode of operation in which the motor is operatively coupled to the exposure regulating device for adjusting the exposure regulating device in accordance with luminance but is ineffective to release the shutter and/or to advance the film element,
      (2) a shutter releasing mode of operation in which the motor is operatively coupled to the shutter for releasing the shutter from its cocked condition to produce an exposure, but is ineffective to advance the film element and/or to adjust the exposure regulating device in accordance with luminance,
      (3) a film advancing mode of operation in which the motor is operatively coupled to the film element received by the camera for advancing the film element but is ineffective to release the shutter and/or to adjust the exposure regulating device according to scene luminance, and
sequencing means for sequentially adjusting said coordinating means to said adjusting, shutter releasing and film advancing modes of operation.

* * * * *

UNITED STATES PATENT AND TRADEMARK OFFICE
CERTIFICATE OF CORRECTION

PATENT NO. : 4,361,387
DATED : November 30, 1982
INVENTOR(S) : Robert P. Cloutier It is certified that error appears in the above-identified patent and that said Letters Patent is hereby corrected as shown below:

Column 4, line 39, "winding" should read -- window --.
Column 6, line 37, "side" should read -- slide --.
Column 7, line 35, "rachet" should read -- ratchet --.
Column 8, line 33, "arm" should read -- arms --.
Column 13, line 9, change the "." to a -- , --.
Column 16, line 61, "when" should read -- in --.
Column 18, line 17, delete "is" first occurrence.
Column 18, line 55, "speed shutter" should read -- shutter speed --.
Column 26, line 45, after "re-" should read -- ) --.
Column 27, line 58, "("off'-" should read -- ("off") --.

Signed and Sealed this

Twelfth Day of July 1983

[SEAL]

Attest:

GERALD J. MOSSINGHOFF

Attesting Officer

Commissioner of Patents and Trademarks